United States Patent
Chuah et al.

(10) Patent No.: US 6,594,240 B1
(45) Date of Patent: Jul. 15, 2003

(54) METHODS AND APPARATUS FOR RANDOM BACKOFF BASED ACCESS PRIORITY IN A COMMUNICATIONS SYSTEM

(75) Inventors: Mooi Choo Chuah, Eatontown, NJ (US); On-Ching Yue, Middletown, NJ (US); Qinqing Zhang, Matawan, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/172,494

(22) Filed: Oct. 14, 1998

Related U.S. Application Data

(63) Continuation-in-part of application No. 09/084,072, filed on May 22, 1998.

(51) Int. Cl.$^7$ ................................................ H04R 7/00
(52) U.S. Cl. ........................................ 370/328; 370/342
(58) Field of Search ................................ 370/328, 329, 370/331, 337, 338, 341, 342, 347, 348, 449, 445, 444, 443, 442, 447, 448, 461, 462, 468, 465, 351, 352, 441, 413, 312; 455/509, 38.2, 466, 515, 547, 512; 340/825.5, 825.01, 825.03, 825.51; 710/41, 108, 116, 120, 241, 244; 375/130, 134, 137, 140

(56) References Cited

U.S. PATENT DOCUMENTS

| | | | |
|---|---|---|---|
| 5,329,531 A | * | 7/1994 | Diepstraten et al. ........ 370/401 |
| 5,448,559 A | * | 9/1995 | Hayter et al. ................ 370/416 |
| 5,682,604 A | | 10/1997 | Kashi et al. |
| 5,729,542 A | | 3/1998 | Dupont |
| 5,940,771 A | * | 8/1999 | Gollnick et al. ............ 370/311 |
| 6,195,338 B1 | | 2/2001 | Decker |

OTHER PUBLICATIONS

J–F. Frigon et al., "A Pseudo–Bayesian Aloha Algorithm with Mixed Priorities for Wireless ATM," IEEE Symposium, pp. 45–49, 1998.

E. Dahlman et al., "UMTS/IMT–2000 Based on Wideband CDMA," IEEE Communications Magazine, pp. 70–80, Sep. 1998.

ETSI SMG2/UMTS L2 & L3 Expert Group, "MS–UTRAN Radio Interface Protocol Architecture; Stage 2," Tdoc SMG2 UMTS–L23 172/98, Sep. 1998.

ETSI SMG2/UMTS Physical Layer Expert Group, "UTRA Physical Layer Description FDD Parts," Tdoc SMG2 UMTS–L1 221/98, vol. 4, Jun. 1998.

* cited by examiner

Primary Examiner—Dang Ton

(57) ABSTRACT

The present invention provides methods and apparatus for providing access priority in a MAC protocol of a communications system such as, for example, with respect to UMTS RACH. Particularly, the invention introduces several access priority methodologies including: (i) random chip delay access priority (RCDAP); (ii) random backoff based access priority (RBBAP); (iii) variable logical channel based access priority (VLCAP); (iv) UMTS-specific variable logical channel based access priority (VLCAP'); (v) probability based access priority (PBAP); and (vi) retransmission based access priority (REBAP). Each methodology associates some parameter or parameters to access priority classes in order to influence the likelihood of a remote terminal completing a successful access request to a base station.

38 Claims, 18 Drawing Sheets

METHODS AND APPARATUS FOR RANDOM BACKOFF BASED ACCESS PRIORITY IN A COMMUNICATIONS SYSTEM

CROSS REFERENCE TO RELATED APPLICATIONS

The present application is a continuation-in-part of the patent application identified as U.S. Ser. No. 09/084,072, filed on May 22, 1998, entitled: "Method for Access Control in a Multiple Access System for Communications Networks." Also, the present application is related to U.S. Ser. No. 09/172,493, filed Oct. 14, 1998 and entitled "Methods and Apparatus for Random Chip Delay Access Priority in a Communications System;" and U.S. Ser. No. 09/172,495, filed Oct. 14, 1998, now U.S Pat. No. 6,400,695 and entitled "Methods and Apparatus for Retransmission Based Access Priority in a Communications System."

FIELD OF THE INVENTION

The present invention relates to methods and apparatus for providing access priority control in a communications system and, more particularly, to methods and apparatus for providing access priority control in a media access control protocol of a Universal Mobile Telecommunications System.

BACKGROUND OF THE INVENTION

A major effort has been underway in the last decade to integrate multimedia capabilities into mobile communications. The International Telecommunications Union (ITU) and other organizations have been attempting to develop standards and recommendations that ensure that mobile communications of the future will be able to support multimedia applications with at least the same quality as existing fixed networks. Particularly, many global research projects have been sponsored in order to develop such next (third) generation mobile systems. Research and Development of Advanced Communication Technologies in Europe, RACE-1, and RACE-2, and Advanced Communications Technology and Services (ACTS) are examples of such efforts in Europe. It is known that in order to provide end users with the requisite service quality for multimedia communications, Internet access, video/picture transfer, high bit rate capabilities are required. Given such requirements, bearer capability targets for a third generation system have been defined as 384 kilobits per second (kb/s) for full coverage area and 2 Megabits per second (Mb/s) for local area coverage.

Universal Mobile Telecommunications System (UMTS) is a new radio access network based on 5 Megahertz Wideband Code Division Multiple Access (W-CDMA) and optimized for support of third generation services including multimedia-capable mobile communications. Since major design goals of UMTS are to provide a broadband multimedia communications system that integrates infrastructure for mobile and fixed communications and to offer, inter alia, the same range of services as provided by the fixed and wireless communications networks, UMTS must provide circuit-switched as well as packet-switched services, a variety of mixed-media traffic types, and bandwidth-on-demand. However, providing multimedia support implies the need for flexibility, that is, being able to support services with different bit rates and $E_b/N_0$ requirements, and to multiplex such services in a multiservice environment. UMTS is designed to be able to support such demands.

Referring to FIG. 1, an exemplary block diagram of a UMTS access network is shown. Particularly, a plurality of remote terminals 2 and 4 (e.g., mobile terminals) communicate with base stations (NODE-B) 6 via W-CDMA wireless links 8. The remote terminals may be a variety of devices such as a wireless phone 2 or a portable personal computer 4 with an internal or external modem. In the UMTS standard, a base station is called a NODE-B. These base stations communicate with a network component that provides radio resource management functions and is called a Radio Network Controller (RNC). Since UMTS is a W-CDMA system, soft handoffs are supported. In the case of soft handoffs, there are two base stations 6 serving one remote terminal. Thus, the remote terminal sends frames to these two base stations. When the two base stations receive the frames from the remote terminal, they send them to a Frame Selector Unit (FSU). The FSU decides which is a better frame, in terms of frame quality, to be sent to the core network. In UMTS, the FSU may be physically integrated with the RNC and as such, in FIG. 1, the RNC and FSU are shown as block 10, but also are separated functionally as block 12 (FSU) and block 14 (RNC). Other elements in the UMTS network perform conventional functions such as: the xLR databases 20, which provide home and visiting location information; and the interworking function (IWF) units 22. It is to be appreciated that the Universal Mobile Switching Center (UMSC) 16 serves as the mobile switching center for the base stations 6 in the UMTS. Sub-networks 18 are wireless service provider networks and CN1 through CNn are the core networks 24 to which the remote terminals are ultimately coupled.

Referring to FIG. 2, a diagram of the typical protocol stack in UMTS is shown. In UMTS, Layer 1 (L1) is the physical layer (PHY) which offers information transfer services to the MAC (Media Access Control) layer and higher layers. The physical layer transport services are described by how and with what characteristics data is transferred over the transport channels of the radio interface. Layer 2 (L2) is comprised of sublayers which include MAC, LAC (Link Access Control), and RLC and RLC' (Radio Link Control). In UMTS, the functions performed in RLC are split and thus two RLC protocols (RLC and RLC') are specified. The RLC and MAC layers provide real-time and non-real-time services. The MAC layer controls but does not carry out the multiplexing of data streams originating from different services. That is, the MAC layer, via logical channels, allows common physical communications channels (e.g., broadcast channel) to be shared by a number of remote terminals. IP (Internet Protocol) is the network layer.

"Uu" refers to the UMTS-specific interface between a remote terminal and a base station, while "Iub" refers to the UMTS-specific interface between a base station and the RNC/FSU. Layer 2 of the radio access network(i.e., left side of NODE-B on the protocol stack) is split into RLC and MAC layers, while Layer 2 of the core network (i.e., right side of NODE-B on the protocol stack) is more related to the technology used to transport network layer frames, e.g., ATM (Asynchronous Transfer Mode) or Frame Relay. IP is shown as the transport protocol, however, UMTS is not so limited. That is, UMTS can cater to other transport protocols. Further details on the protocol layers may be found in Dahlman et al., "UMTS/IMT-2000 Based on Wideband CDMA," IEEE Communications Magazine, pp. 70–80 (September 1998) and in ETSI SMG2/UMTS L2 & L3 Expert Group, "MS-UTRAN Radio Interface Protocol Architecture; Stage 2," Tdoc SMG2 UMTS-L23 172/98 (September 1998).

In UMTS, four types of application traffic need to be handled. They include: (i) applications that are both delay and loss sensitive, e.g., interactive video; (ii) applications that are loss sensitive but can tolerate moderate delay, e.g., interactive data; (iii) applications that are delay sensitive but tolerant of moderate losses, e.g., voice; and (iv) applications that are tolerant of both delay and losses, e.g., file transfer.

To provide different Quality of Service (QoS) to all these different applications, the UMTS system must be designed appropriately. Several important issues need to be considered in UMTS system design such as, for example, how to satisfy QoS without wasting network resources and how to operate the systems in the stable region when all traffic types burst simultaneously.

Further, several components are required in UMTS to support varying QoS. For example, service parameters need to be defined to enable different applications to specify their different QoS requirements, e.g., the Guaranteed Service and Controlled Load Service. parameters defined by the Internet Engineering Task Force (IETF). Users can ask for bandwidth resources either on a burst mode or connection mode. Also, there must be an admission control component in UMTS that makes decisions as to whether or not users' requests will be granted. The admission of new requests must be done such that even when all admitted requests peak simultaneously, the QoS requirements of each request will not be violated (unless they are best-effort requests). Further, once the users' requests are admitted, there must be features implemented in the UMTS network to deliver such service guarantees, e.g., delay requirement, packet loss requirement. Scheduling algorithms at the network nodes and packet marking for non-conformant users' traffic are some of the features that can be supported by routers to provide differentiated services.

In order to provide end-to-end QoS in UMTS, certain features need to be provided at the MAC layer to ensure different QoS. One possible way of providing different QoS is by providing priority mechanisms. Priority mechanisms can be implemented in terms of access priority, service priority or buffer management schemes. There are various types of service priority mechanisms, e.g., fixed priority, dynamic priority. Fixed priority mechanisms include, e.g., strict priority and weighted round robin. Dynamic priority schemes include, e.g., fair share queuing, self-clock fair share queuing and worst case fair share queuing disciplines.

With respect to access priority, several well-known channel access protocols are currently used in wireless data systems, such as Slotted Aloha, PRMA, etc. Conventional Slotted Aloha is a relatively simple protocol but, because it does not attempt to avoid or resolve collisions between data users, its theoretical capacity is just 0.37.

Reservation-based protocols attempt to avoid and resolve collisions by dynamically reserving channel bandwidth for users needing to send packets. Typically, in such protocols a channel is divided into slots that are grouped into frames of N slots. A slot can be further subdivided into k minislots. Normally, $A_1$ of the slots will be used for reservation purposes while the remaining $A-A_1$ slots are data slots. The users that need to send packets send a reservation request packet in one of the $B=A_1*k$ minislots. If the reservation request packet is successful, then the user will be allocated a certain number of data slots until the user or the base station releases the reservation. If the reservation request packet is not successful, the user will use a conflict resolution method to retransmit the reservation request until it is successfully transmitted.

Access priority control is particularly critical with respect to one of the logical channels associated with the media access control (MAC) protocol of UTMS, namely, the random access channel (RACH). RACH is an up-link common transport channel used to carry control information and short user packets from a remote terminal. Referring to FIG. 3, a block diagram of an exemplary hardware implementation of a non-coherent RACH detection algorithm for use in a UMTS base station (NODE-B in FIG. 1) is shown. The RACH receiver 30 is capable of providing the following functions: detection, demodulation and decoding, and acknowledgement. The purpose of detection is to determine if a RACH burst, described below, is being sent by a remote terminal and to resolve the strongest multipath components of the incoming burst. The receiver 30 also demodulates and decodes the message contained within the corresponding RACH to ascertain the remote terminal identifier and the requested service. After decoding a remote terminal RACH transmission, the receiver generates an acknowledgement signal which the base station transmits to the remote terminal over a Forward Access Channel (FACH).

The RACH receiver 30 preferably performs the above functions in accordance with the following structure. A RACH transmission burst is received and demodulated by mixers 32 and then filtered in filters 34. The signal is then sampled in sampling unit 36. Despreader 38 decodes the signal in accordance with the spreading sequence, in this case, 512 Gold code. The decoded signal is buffered (buffer 40) and sent to time shifting unit 50. Also, the output of the despreader 38 is provided to integrator 42. The outputs of the integrator 42 are mixed (mixer 44) and provided to timing detector 46 and then threshold detector 48. The output of the threshold detector 48 indicates whether a valid signal was received from the remote terminal. This result is provided to time shifting unit 50. If it is a valid signal (e.g., above pre-determined thresholds), the decoded signal is then down-sampled by unit 52. Then, depending on the preamble, described below, the signal passes through the 16 tap filter unit 54 to the preamble signature searcher 56. The output of the searcher 56 provides the base station with the remote terminal's identifier and information as to the service(s) requested by the remote terminal.

It is known that the physical RACH is designed based on a Slotted ALOHA approach. A remote terminal can transmit a random access burst 100 at eight well-defined time offsets (Access slot #1, ..., Access slot #i, ..., Access slot #8) relative to the frame boundary of the received broadcast control channel (BCCH) of the current cell, as illustrated in FIG. 4A. As shown in FIG. 4B, the random access burst consists of two parts, a preamble part 102 of length 1 millisecond (ms), a message part 104 of length 10 ms, and an idle time 106 of length 0.25 ms in between the preamble part and the message part. There are a total of 16 different preamble signatures that are based on the Orthogonal Gold code set of length 16 (512 Gold code). The information on the available signatures and time offsets are broadcast on BCCH. Based on this structure, if the receiver has 128 (16 preamble signatures multiplied by 8 timeslots) parallel processing units, 128 random access attempts can be simultaneously detected. In other words, we have equivalent 128 random access channels for a maximum configured base station for the current cell.

Accordingly, there is a need for methods and apparatus for providing access priority in UMTS that addresses the unique requirements associated with such a broadband multimedia communications system. Specifically, there is a need for methods and apparatus for providing access priority with respect to UMTS RACH.

SUMMARY OF THE INVENTION

The present invention provides methods and apparatus for providing access priority in a MAC protocol of a communications system such as, for example, with respect to UMTS RACH. Particularly, the invention introduces several access priority methodologies including: (i) random chip delay access priority (RCDAP); (ii) random backoff based access priority (RBBAP); (iii) variable logical channel based access priority (VLCAP); (iv) a UMTS-specific variation to the variable logical channel based access priority scheme (VLCAP'); (v) probability based access priority (PBAP); and (vi) retransmission based access priority (REBAP).

In one aspect of the invention, RCDAP methods and apparatus are provided. In RCDAP, each priority class is advantageously assigned a different chip delay from among chip delay distributions prior to submitting an access request to the base-station. Preferably, those classes with a higher priority are given a smaller average random chip delay such that their access requests will have a higher probability of being captured compared to those submitted by users with a lower priority class.

In another aspect of the invention, RBBAP methods and apparatus are provided. In RBBAP, each priority class is advantageously assigned a different backoff delay. Preferably, requests associated with higher access priority will have a smaller average backoff delay. Whenever there is a collision or some other reason an access request is not successfully received at the base station, the remote terminal, depending on the class i, chooses a random delay distributed between a pre-determined range.

In yet another aspect of the invention, VLCAP methods and apparatus are provided. In VLCAP, each subscriber is given an access priority class i. Preferably, those with the highest priority can access all the logical access channel for which the base station is configured, while those with lowest priority are only allowed to access a small subset of logical access channels, e.g., only one preamble signature with 8 time offsets. A rationale behind this approach is that the larger the number of logical access channels that the remote terminal has to choose from, the higher the likelihood of finding a channel on which the request will be successfully transmitted.

In a further aspect of the present invention, a UMTS-specific variation of VLCAP methods and apparatus are provided. The VLCAP' approach, specifically takes into account a special UMTS access channel structure. That is, even though there are t time offsets for each preamble signature, there may not be t parallel processing units at the base station due to a limitation on the processing complexity associated with the base station. For example, there may only be four receivers with each receiver programmed to capture, for example, the ($i^{th}$, $(i+4)^{th}$) time offsets. Thus, according to the VLCAP' approach, those requests with lower priority classes will be assigned a higher number for the time offsets, thus allowing the access requests from higher priority classes to be captured by the receivers first.

In still a further aspect of the invention, PBAP methods and apparatus are provided. In PBAP, each subscriber is given an access priority class i. Each access priority class i can only transmit access requests with a certain probability $P_i$. Those with the highest priority always transmit their access requests whenever they have an access request.

In yet another aspect of the invention, REBAP methods and apparatus are provided. In REBAP, access requests have an access packet priority (APP) associated therewith whereby retransmitted access requests are given a higher priority over new access requests.

It is to be appreciated that access priority techniques implemented according to the present invention may include a combination of more than one of the above embodiments. For example, RCDAP can be performed with RBBAP or VLCAP and PBAP, and so on.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

The present invention is described below in the context of access priority control in the MAC layer of the UMTS, particularly, with respect to access priority control in the random access channel or RACH. However, it is to be appreciated that the teachings of the invention discussed herein are not so limited. That is, the access priority methodologies of the invention are applicable to other communications systems where remote terminals (e.g., mobile or fixed) make random attempts to secure access to a communication channel associated with a base station or other communications system access point. In addition, it is to be understood that methodologies described herein for use in a remote terminal or a base, station are executed by one or more processors respectively associated therewith. The term "processor" as used herein is intended to include any processing device, including a CPU (central processing unit) and associated memory. Accordingly, software instructions or code associated with implementing the methodologies of the present invention may be stored in associated memory and, when ready to be utilized, retrieved and executed by an appropriate CPU. Also, the term "remote terminal" refers to any device capable of communications with a base station. For example, a remote terminal may be mobile (e.g., wireless phone or portable personal computer with a wireless modem) or fixed (e.g, fixed personal computer with a wireless modem). Also, the terms "base station" and "node_b," are used interchangeably herein.

As stated above, the present invention relates to subject matter disclosed in the patent application described as U.S. Ser. No. 09/084,072, filed on May 22, 1998, entitled: "Method for Access Control in a Multiple Access System for Communications Networks," wherein another MAC protocol, referred to as "on-demand multiple access fair queuing" or ODMAFQ, is described. A section entitled "ODMAFQ MAC Protocol Operation," describing the related MAC functions, follows the detailed description of the present invention.

Figure 1:
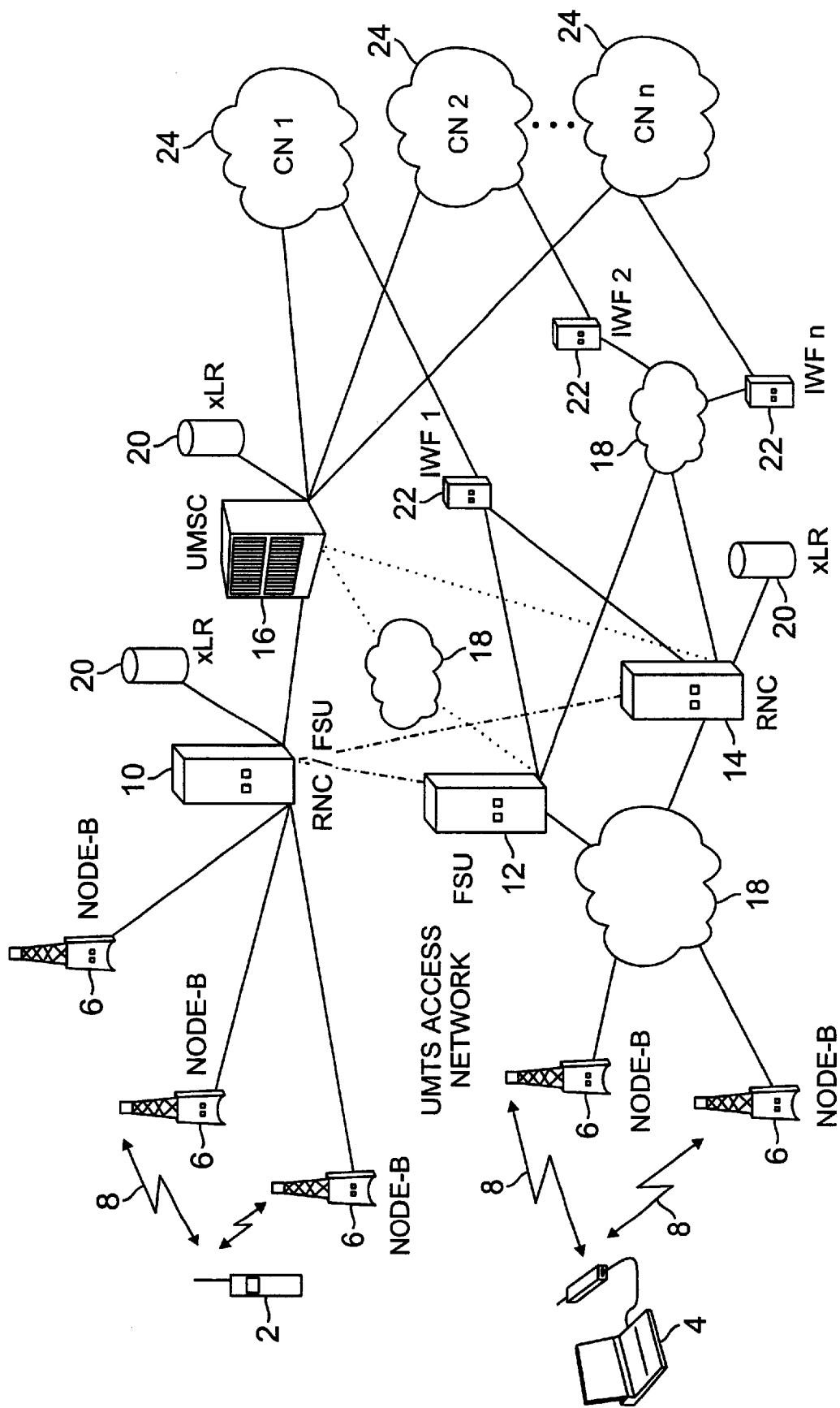
FIG. 1 is a block diagram of a UMTS access network.
Figure 2:
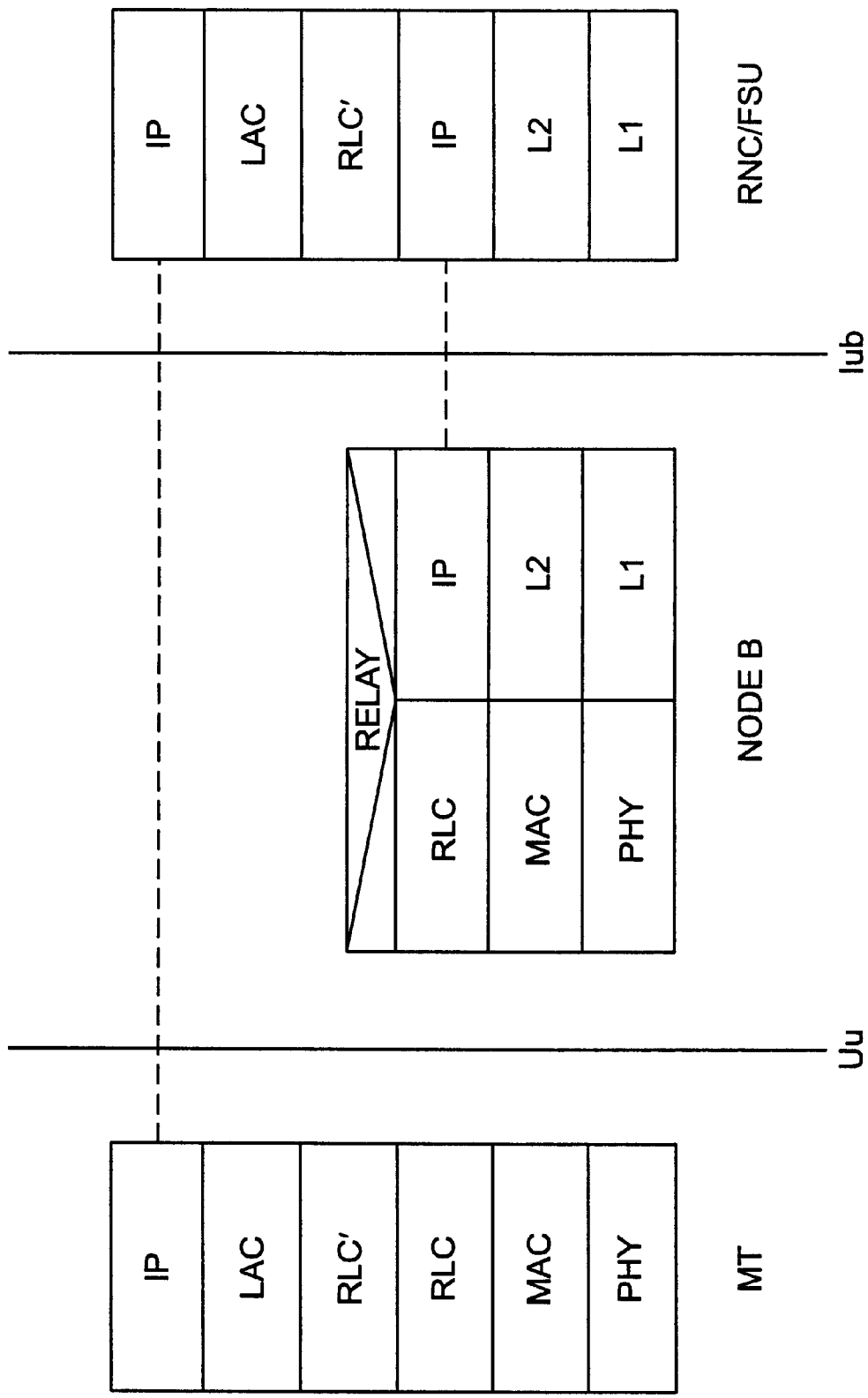
FIG. 2 is a diagram of a protocol stack associated with a UMTS.
Figure 3:
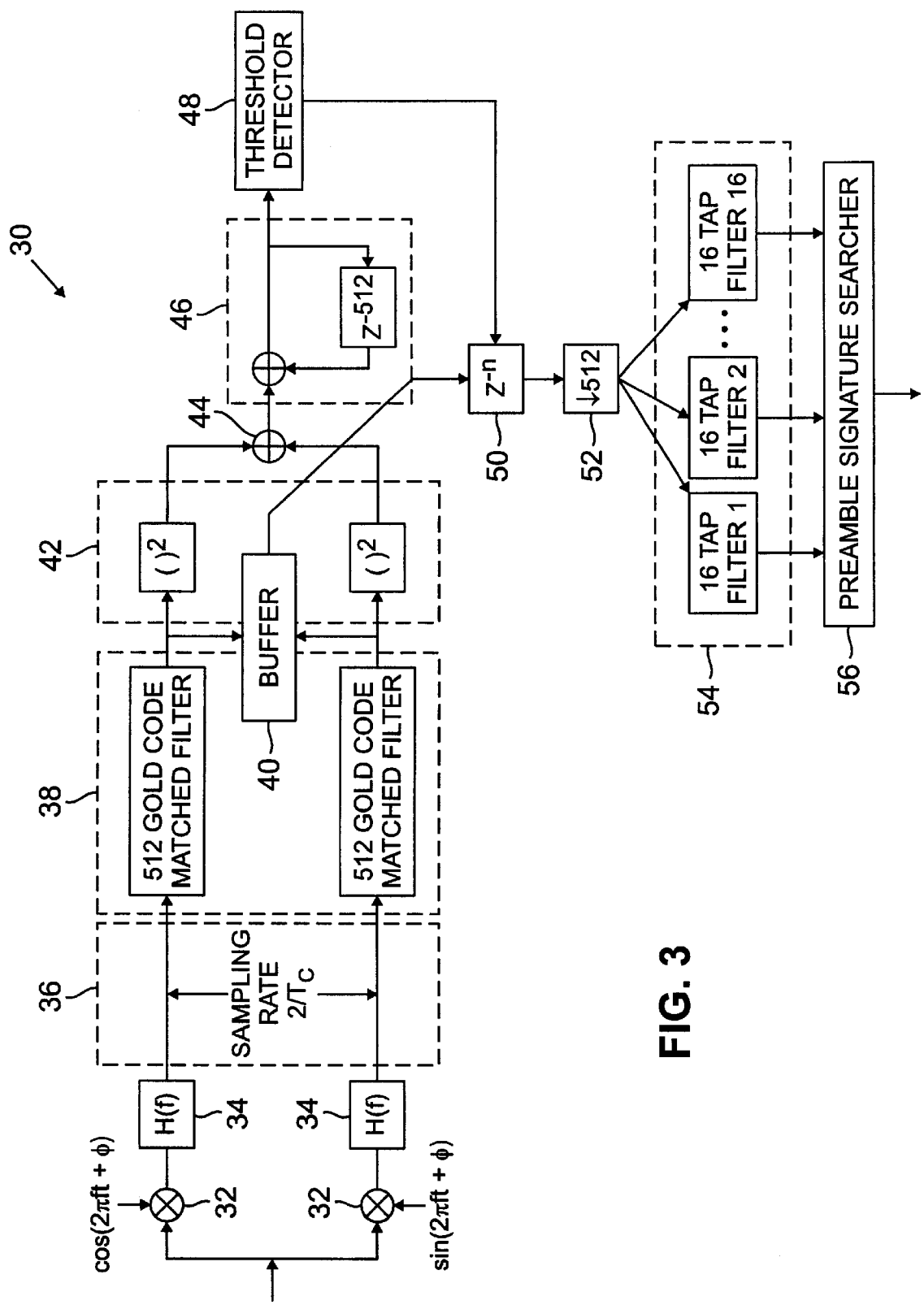
FIG. 3 is a block diagram of a non-coherent RACH receiver for use in a UNMTS.
Figure 4A:
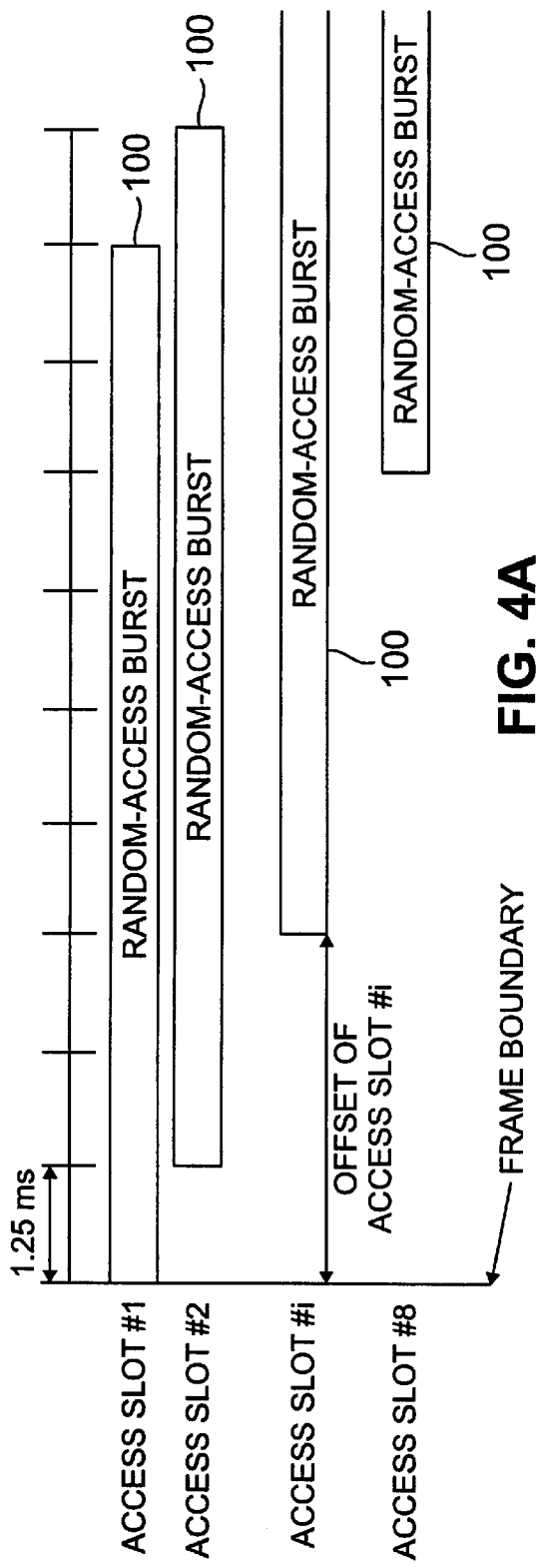
FIGS. 4A and 4B illustrate access slots and a structure of a random access burst used in a UMTS RACH.
Figure 4B:
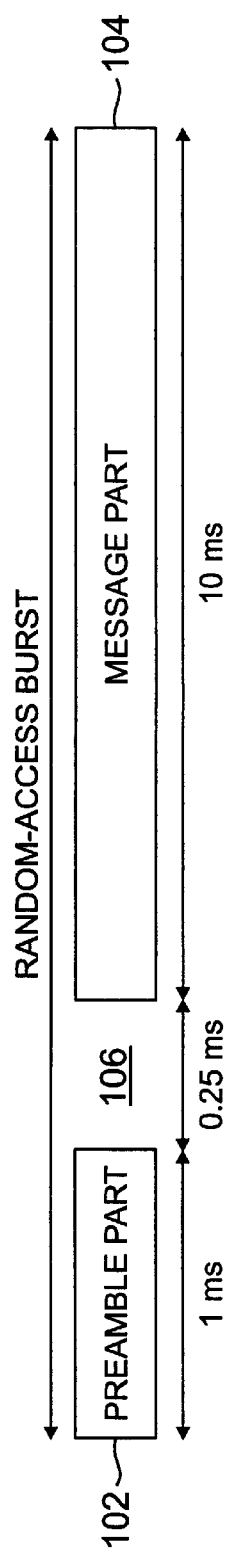

Referring back to FIG. 1 and as previously mentioned, it is to be understood that the remote terminals, 2 and 4, are coupled, to the UMTS access network through a wireless interface with base stations 6. In order to establish communications, the remote terminals send and receive media access control (MAC) frames over the wireless interface to and from the base stations 6. In the case of the terminal 4, an internal or external modem may be used to provide a wireless connection with the base stations. A remote terminal, such as remote terminal 2, typically has its own internal modem. Nonetheless, packets are typically generated or received at the remote terminal on a bursty random basis. The packets are buffered at the remote terminals until they are transmitted uplink to a base station. The base stations 6, as is known, provide wide-area wireless coverage and multiplex remote terminal traffic from their respective coverage area to their system'mobile switching center, e.g., UMSC 16 in FIG. 1. The base stations also broadcast (down-link) packets that are destined for one or more of the remote terminals in its cell.

The UMTS multiple access scheme is a time-slotted system (i.e., Slotted ALOHA approach) in which a random access channel (RACH) and a packet transmission channel are formed on a slot-by-slot basis. Time slot duration in each channel is chosen based on the particular system implemented. Generally, remote terminals that have packets to send transmit access requests via the RACH to a base station. Due to the potentially large number of remote terminals as compared to the relatively smaller number of access channels that a base station is configured to support, access priority schemes are necessary to ensure orderly and timely handling of network traffic. That is, given the fact that many remote terminals may randomly seek to acquire use of a single communications channel (i.e., they request channel bandwidth to transfer packets), methods for prioritizing access requests must be implemented in the network in order to permit remote terminals with a relatively high need to access channel bandwidth associated with a base station over remote terminals with a relatively low need. So, for example, if two remote terminals have packet data to be transmitted to the base station, it is preferred that the access request of the remote terminal with the higher access need be more likely to be received and granted before the other remote terminal. However, it is to be appreciated that the priority class of the remote terminal is dynamic, that is, it depends on the nature and/or content of the packets to be transmitted and/or on the nature of the remote terminal. For instance, if the packets represent data that is delay sensitive (e.g., interactive video, voice) or is of a nature that warrants immediate transmission (e.g., emergency situation), then the remote terminal selects a priority class with a priority that is commensurate with the situation, i.e., in these cases, a high priority. Also, depending on the service level (e.g., premium or regular) that the remote terminal is subscribed to, a different access priority is assigned.

Figure 11:
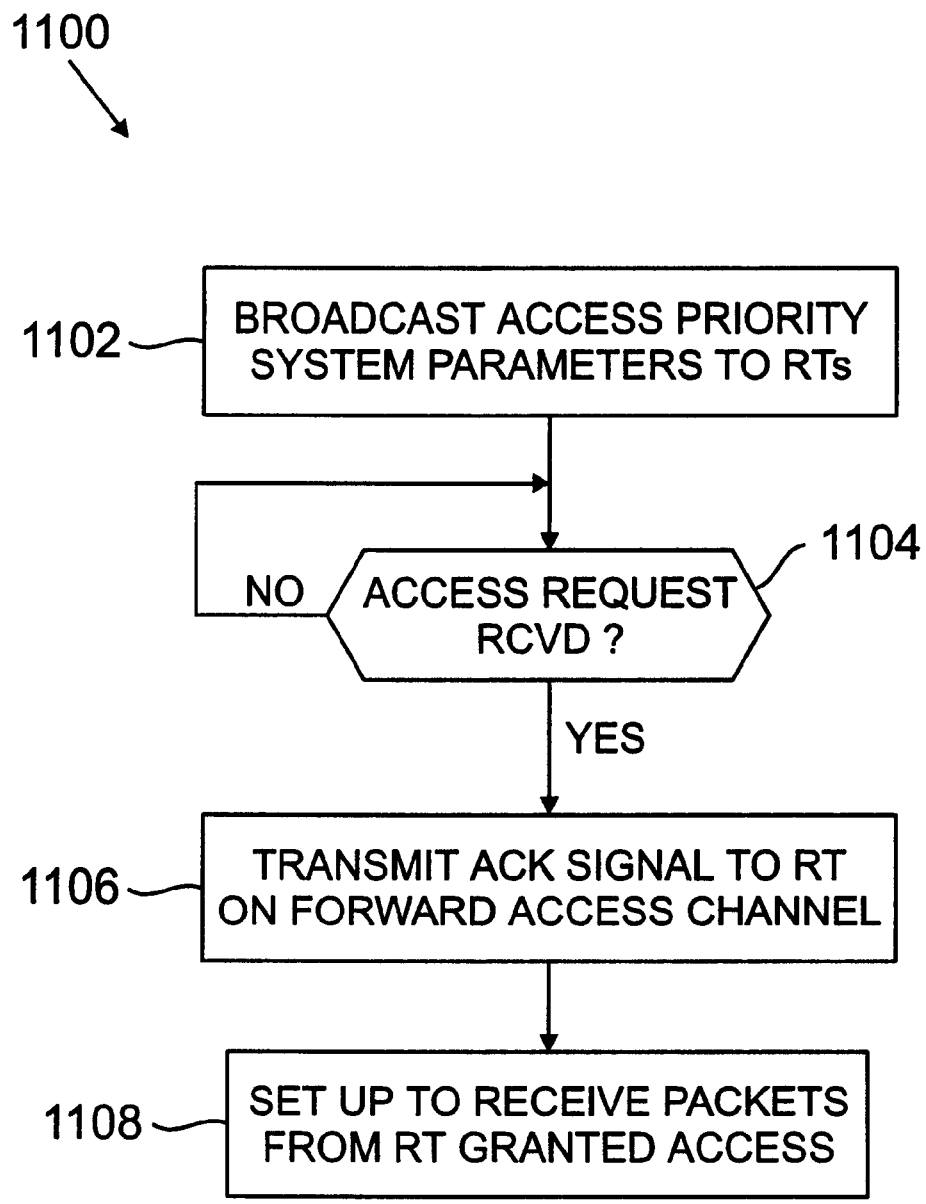
FIG. 11 is a flow chart of a method of access priority control at a base station according to the present invention.

Referring initially to FIG. 11, a flow chart of a method 1100 of access priority control at a base station according to the invention is shown. In UMTS, a base station (e.g., base station 6) broadcasts (step 1102) access priority system parameters in a beacon or pilot signal to the remote terminals (RTs) in its coverage area. As will be particularly explained in accordance with the methodologies of access priority performed at a remote terminal, the access priority system parameters include parameters that the remote terminal uses in its base station access request process. That is, the base station transmits parameters pertaining to each pre-established priority class that the remote terminal receives and stores for use during an access request. In step 1104, the base station (via the processor associated therewith) determines if an access request is received from a remote terminal. If not, the base station waits for one to be received. If an access request is received from a remote terminal, the base station transmits (step 1106) an acknowledgement message to the remote terminal to indicate that the request was successfully received. This acknowledgement signal is transmitted on a Forward Access Channel (FACH) between the base station and the remote terminal. The base station then prepares for receipt of the packet data from the remote terminal granted access according to a packet data receipt procedure employed in UMTS (step 1108).

Figure 5:
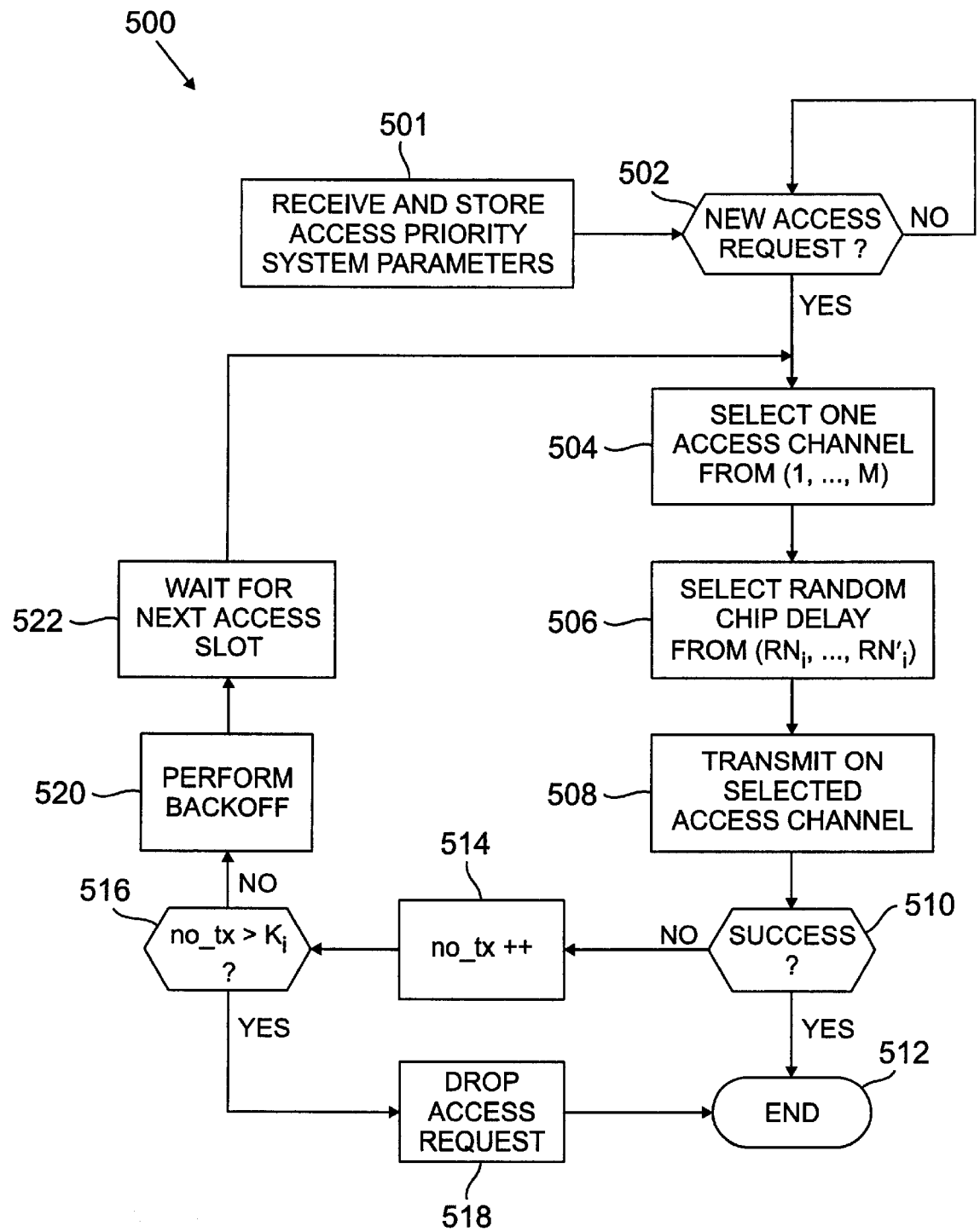
FIG. 5 is a flow chart of a method of access priority control at a remote terminal according to a first embodiment of the present invention.

Referring now to FIG. 5, a flow chart of a method 500 of access priority control at a remote terminal according to a first embodiment of the present invention is shown. It is to be appreciated that this methodology is performed in a remote terminal (e.g., terminal 2 or 4) which has generated or received packets to be up-linked to a UMTS base station (e.g., base station 6). The embodiment illustrated in FIG. 5 is hereinafter referred to as Random Chip Delay Access Priority (RCDAP). Generally, in the RCDAP approach, each priority class is advantageously assigned a different average random chip delay prior to submitting an access request to the base station. Each chip is known to be a certain time duration and, as such, each chip represents a certain time delay. Thus, a chip delay's time duration is directly related to the number of chips in the delay. Longer delays have more chips then shorter delays. It is to be appreciated that the use of chip delays is due to the use of a CDMA, wireless interface (W-CDMA) between remote terminals and base stations in UMTS. According to this embodiment of the invention, those classes with a higher priority are given a smaller average random chip delay such that their access requests will have a smaller time delay and thus a higher probability of being captured compared to those submitted by users with a lower priority class.

In the access priority embodiment in FIG. 5, the remote terminal, in step 501, receives and stores (in its memory) the following access priority system parameters broadcast by the base station: M which is the number of logical access channels which exist between the remote terminal and the base station; $K_i$ which is the maximum number of retransmission attempts for each class i; a random chip delay for each class i distributed between ($RN_i$, ..., $RN_i'$), where $RN_i<RN_{i+1}$, $RN_i'<RN_{i+1}'$, e.g., $RN_0<RN_1$, $RN_0'<RN_1'$. It is to be appreciated that i=0,1, ..., etc. Thus, the chip delay associated with access priority class 0 (highest priority) is selected from a distribution of random chip delays that on average are smaller than the chip delays in the distribution associated with a lower access priority class, e.g., class 1. Thus, a remote terminal set as class 0 has a higher priority than a remote terminal set at class 1.

Accordingly, in step 502, the remote terminal (via the processor associated therewith) determines whether a new access request is required due to receipt of packets to be transmitted. If so, in step 504, the remote terminal selects a logical access channel (1, ..., M). Then, based on the required priority class (e.g., due to nature or content of the data to be transmitted) or priority class attributed to the remote terminal (e.g., if the user of the remote terminal has subscribed to a particular level of service, e.g., regular, premium), the remote terminal selects a random chip delay from distribution ($RN_i$, ..., $RN_i'$) in step 506. So, if the priority of the transmission is high, the remote terminal selects from the lowest random chip delay distribution thereby increasing the likelihood of a successful request. If the priority of the transmission is low, the remote terminal selects from the highest random chip delay distribution thereby decreasing the likelihood of a successful request as compared to those remote terminals requesting access at a higher priority class. Of course, depending on the priority, the remote terminal may select from any random chip delay distribution in between. The access request is then transmitted according to the selected chip delay on the selected logical access channel, in step 508.

Next, in step 510, the terminal determines whether the access request was successfully received by the base station. This may be accomplished by the base station transmitting an access request acknowledge message to the terminal (step 1106, in FIG. 11). If the access request has been successful, then the access priority control method ends (block 512) and the remote terminal can transmit its packets according to the packet transfer scheme employed in the UMTS.

However, if the request is not successful, in step 514, the terminal increments a variable, referred to as no_tx, by one (no_tx++). It is to be understood that the variable no_tx represents the number of times an access request has been transmitted by the remote terminal (the value is stored in the memory associated with the remote terminal processor). In step 516, no_tx is compared to $K_i$ (the maximum number of retransmission attempts for class i). If no_tx is greater than $K_i$, then the current access request is dropped (step 518). It is to be understood that higher priority classes are assigned a higher $K_i$ (i.e., $K_i \geq K_{i+1}$) so that more retransmission attempts may be made. If the maximum number of retransmissions has not been reached, then a backoff process is performed, in step 520. It is to be appreciated that a backoff procedure is preferably employed since, assuming several remote terminals unsuccessfully attempted to transmit access request signals at about the same time (the lack of success may be due to, for example, collisions between requests), it is not preferable for each remote terminal to attempt to re-transmit at around the same time. Thus, each terminal delays its retransmission for a randomly selected amount of time such that the likelihood of collisions of the re-transmitted access requests is decreased. In an alternative embodiment, backoff may be performed according to the inventive procedure described below with respect to FIG. 6. After backoff, the remote terminal waits, in step 522, for the next available access slot and then returns to step 504 to repeat the process.

Figure 6:
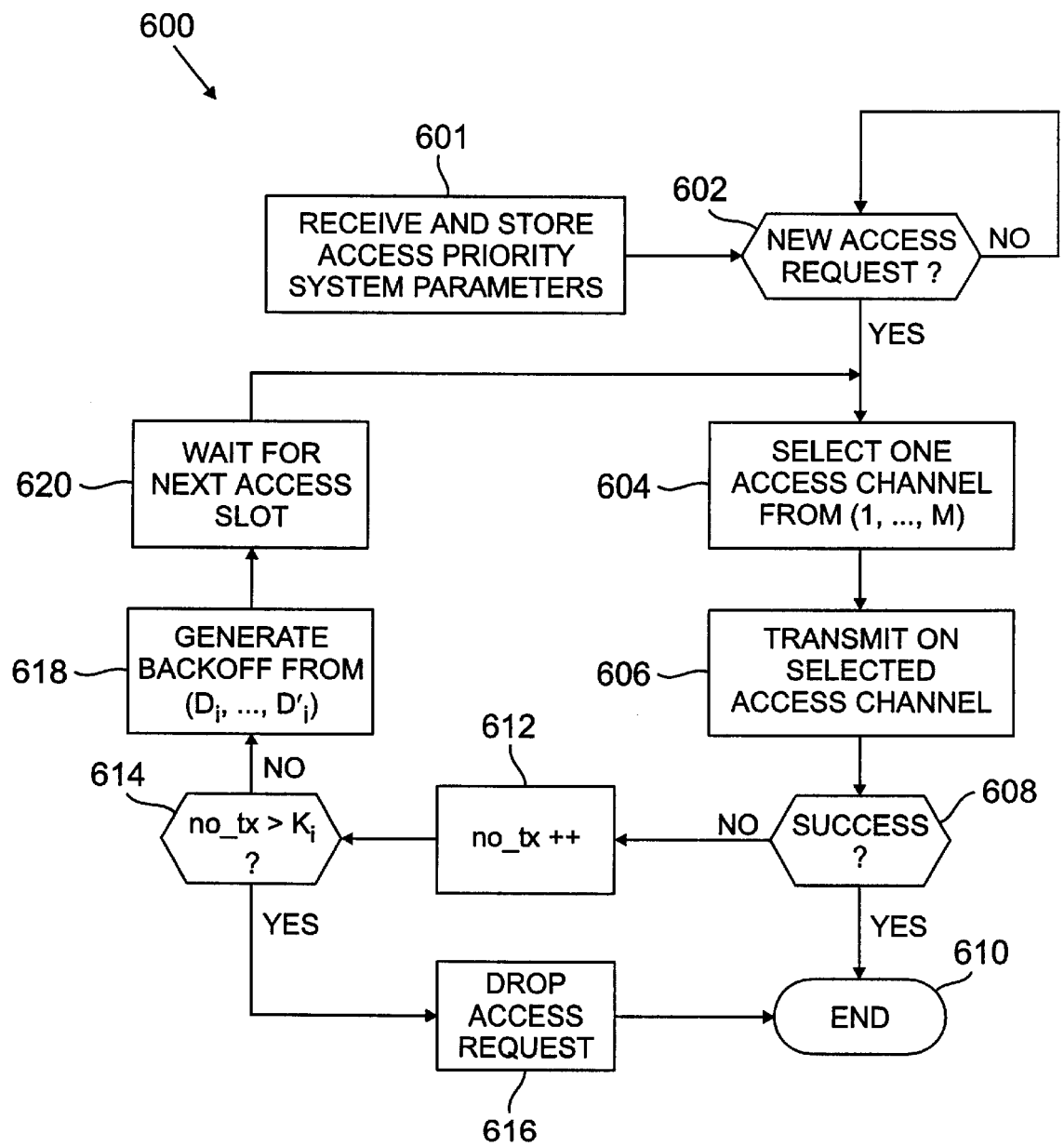
FIG. 6 is a flow chart of a method of access priority control at a remote terminal according to a second embodiment of the present invention.

Referring now to FIG. 6, a flow chart of a method 600 of access priority control at a remote terminal according to a second embodiment of the present invention is shown. Again, it is to be appreciated that this methodology is performed in a remote terminal (e.g., terminal 2 or 4) which has generated or received packets to be transmitted uplink to a UMTS base station (e.g., base station 6). The embodiment illustrated in FIG. 6 is hereinafter referred to as Random Backoff Based Access Priority (RBBAP). Generally, in the RBBAP approach, each priority class is advantageously assigned a different average backoff delay. Requests associated with higher access priority will have a smaller average backoff delay. Whenever there is a collision or other reason an access request is not successfully received at the base station, the remote terminal, depending on the class i, chooses a random delay distributed between the range ($D_i$, ..., $D_i'$) with $D_i \leq D_i'$, $D_i \leq D_{i+1}$, $D_i' \leq D_{i+1}'$, where class i has a higher priority than class i+1.

In the access priority embodiment in FIG. 6, the remote terminal, in step 601, receives and stores (in its memory) the following access priority system parameters broadcast by the base station: M which is the number of logical access channels which exist between the remote terminal and the base station; $K_i$ which is the maximum number of retransmission attempts for each class i; a random delay distributed between the range ($D_i$, ..., $D_i'$) with $D_i \leq D_i'$, $D_i \leq D_{i+1}$, $D_i' \leq D_{i+1}'$, where class i has a higher priority than class i+1. Thus, a backoff delay associated with a higher access priority class is selected from a distribution of random backoff delays that on average are smaller than backoff delays in a distribution associated with a lower access priority class. For example, a remote terminal set as class 0 has a higher priority than a remote terminal set at class 1.

Accordingly, in step 602, the remote terminal (via the processor associated therewith) determines whether a new access request is required due to receipt of packets to be transmitted. If so, in step 604, the remote terminal selects a logical access channel (1, ..., M). The access request is then transmitted on the selected logical access channel, in step 606. Next, in step 608, the terminal determines whether the access request was successfully received by the base station. Again, this may be accomplished by the base station transmitting an access request acknowledge message to the terminal (step 1106 in FIG. 11). If the access request has been successful, then the access priority control method ends (block 610) and the remote terminal can transmit its packets according to the packet transfer scheme employed in the UMTS.

However, if the request is not successful, in step 612, the terminal increments variable no_tx by one. In step 614, no_tx is compared to $K_i$. If no_tx is greater than $K_i$, then the current access request is dropped (step 616). If the maximum number of retransmissions has not been reached, then a backoff process is performed, in step 618. In step 618, based on the required priority class or priority class attributed to the remote terminal, the remote terminal selects a random backoff delay from distribution ($D_i$, ..., $D_i'$). So, if the priority of the transmission is high, the remote terminal selects from the lowest random backoff delay distribution thereby increasing the likelihood of a successful request. That is, the backoff delay is relatively short such that re-transmission is relatively sooner than for lower classes. If the priority of the transmission is low, the remote terminal selects from the highest random backoff delay distribution thereby decreasing the likelihood of a successful request as compared to those remote terminals requesting access at a higher priority class. Of course, depending on the priority, the remote terminal may select from any random backoff delay distribution in between. After backoff, the remote terminal waits, in step 620, for the next available access slot and then returns to step 604 to repeat the process.

Figure 7:
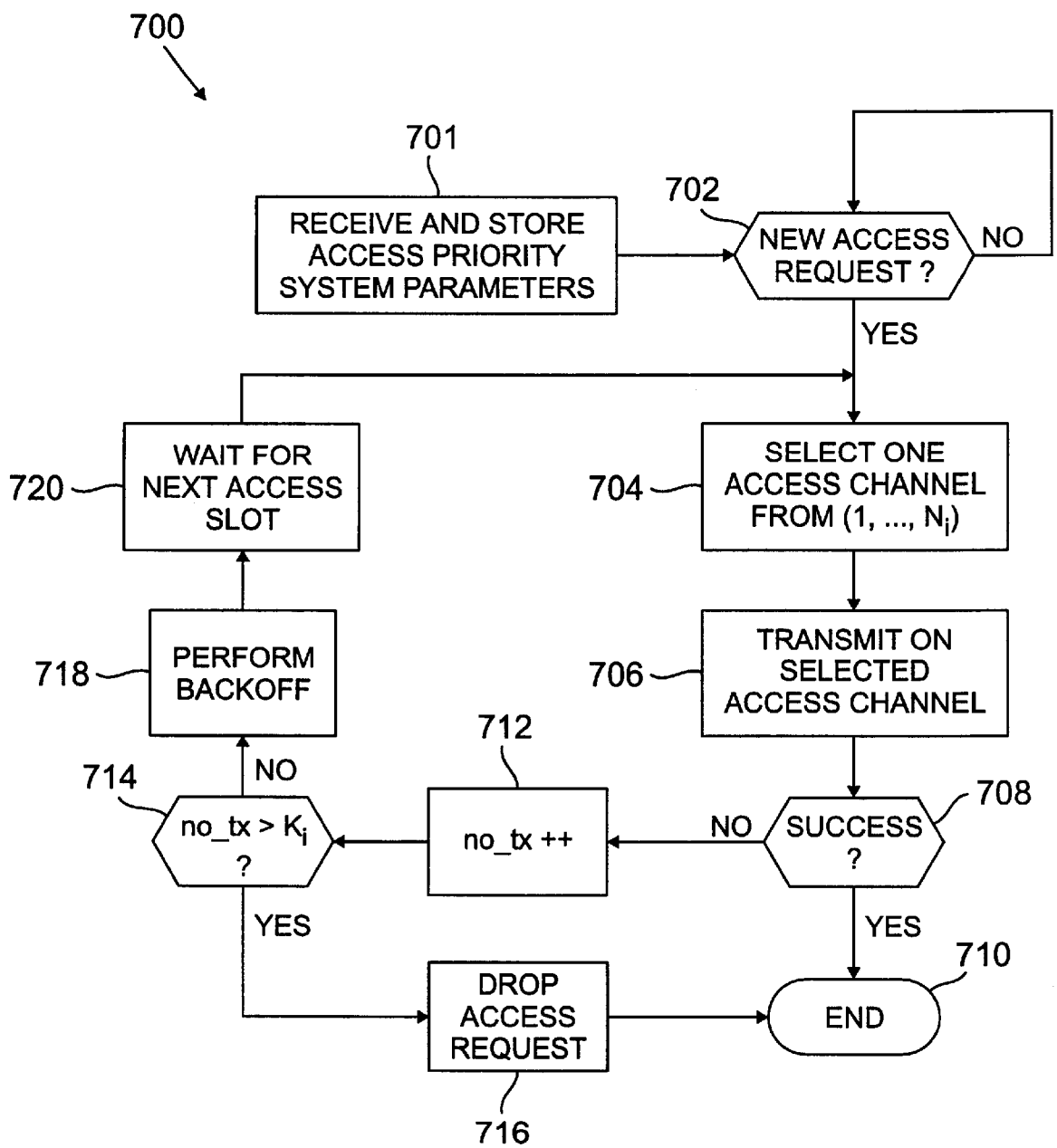
FIG. 7 is a flow chart of a method of access priority control at a remote terminal according to a third embodiment of the present invention.

Referring now to FIG. 7, a flow chart of a method 700 of access priority control at a remote terminal according to a third embodiment of the present invention is shown. Again, it is to be appreciated that this methodology is performed in a remote terminal (e.g., terminal 2 or 4) which has generated or received packets to be transmitted uplink to a UMTS base station (e.g., base station 6). The embodiment illustrated in FIG. 7 is hereinafter referred to as Variable Logical Channel-based Access Priority (VLCAP). Generally, in the VLCAP approach, each subscriber is given an access priority class i. Those with the highest priority (class 0) can access all the logical access channel for which the base station is configured (e.g., 16×8), while those with lowest-priority are only allowed to access a small subset of logical access channels, e.g., only one preamble signature with 8 time offsets. A rationale behind this approach is that the larger the number of logical access channels that the remote terminal has to choose from, the higher the likelihood of finding a channel on which the access request will be successfully transmitted.

In the access priority embodiment in FIG. 7, the remote terminal, in step 701, receives and stores (in its memory) the following access priority system parameters broadcast by the base station: M which is the number of logical access channels which exist between the remote terminal and the basestation; $N_i$ which is the maximum number of logical access channels class i can access, where $N_i > N_{i+1}$ and $N_0 = M$; and $K_i$ which is the maximum number of retransmission attempts for each class i.

Accordingly, in step 702, the remote terminal (via the processor associated therewith) determines whether a new access request is required due to receipt of packets to be transmitted. If so, in step 704, the remote terminal selects a logical access channel $(1, \ldots, N_i)$. That is, the logical channel is selected from a set of logical channels where the size of the set depends on the priority class of the request. If the request is in accordance with the highest priority class, the remote station can choose from all M logical access channels, while decreasing priority requests have decreasing sized subsets from which to-choose. In an alternative embodiment, the remote terminal can store and then select a random chip delay at this point according to the RCDAP approach in FIG. 5. The access request is then transmitted on the selected logical access channel, in step 706. Next, in step 708, the terminal determines whether the access request was successfully received by the base station. Again, this may be accomplished by the base station transmitting an access request acknowledge message to the terminal (step 1106 in FIG. 11). If the access request has been successful, then the access priority control method ends (block 710) and the remote terminal can transmit its packets according to the packet transfer scheme employed in the UMTS.

However, if the request is not successful, in step 712, the terminal increments variable no_tx by one. In step 714, no_tx is compared to $K_i$. If no_tx is greater than $K_i$, then the current access request is dropped (step 716). If the maximum number of retransmissions has not been reached, then a backoff process is performed, in step 718. In an alternative embodiment, the backoff process is the same as described above in step 618 of FIG. 6. After backoff, the remote terminal waits, in step 720, for the next available access slot and then returns to step 704 to repeat the process.

Figure 8:
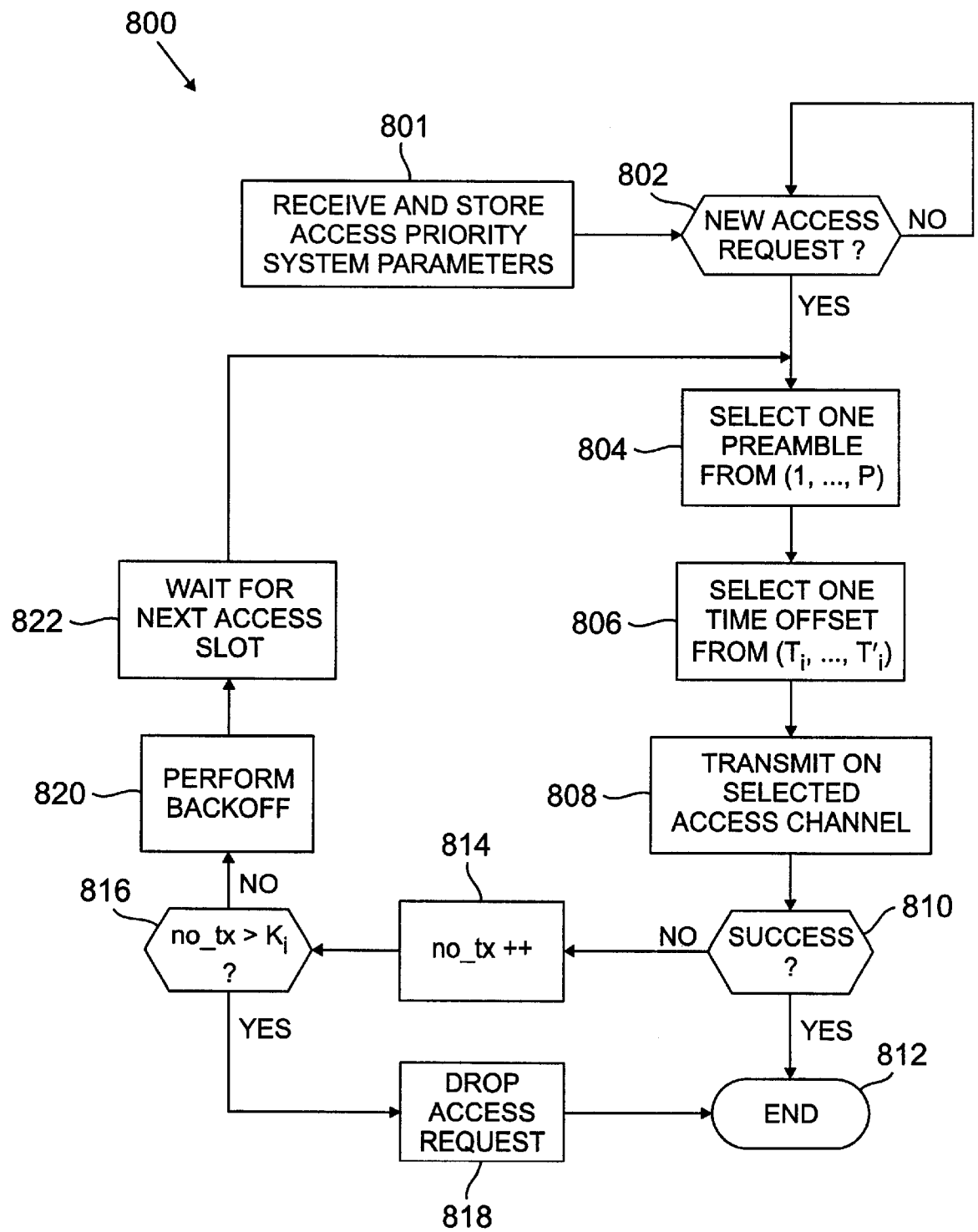
FIG. 8 is a flow chart of a method of access priority control at a remote terminal according to a fourth embodiment of the present invention.

Referring to FIG. 8, a flow chart of a method 800 of access priority control at a remote terminal according to a fourth embodiment of the present invention is shown. It is to be understood that method 800 is a variation of the VLCAP scheme of FIG. 7. The variation is referred to as VLCAP' and specifically takes into account a special UMTS access channel structure. That is, even though there are 8 time offsets for each preamble signature, there may not be eight parallel processing units at the base station due to a limitation on the processing complexity associated with the base station. For example, there may only be four receivers with each receiver programmed to capture, for example, the $(i^{th}, (i+4)^{th})$ time offsets. However, it is to be appreciated that the time offsets do not have to be in sequence. That is, the receiver may capture the first four time offsets received, e.g., time offsets 1, 3, 5, and 6. Thus, according to the VLCAP' approach, those requests with lower priority classes will be assigned a higher number for the time offsets, thus allowing the access requests from higher priority classes to be captured by the receivers first. That is, if the class is a high priority class, it has the low time offsets assigned thereto (e.g., 1 through 4) from which to select, while a class of a low priority has the high time offsets assigned thereto (e.g., 5 through 8) from which to select. Therefore, the higher priority access requests are more likely to be received over the lower priority access requests.

In the access priority embodiment in FIG. 8, the remote terminal, in step 801, receives and stores (in its memory) the following access priority system parameters broadcast by the base station: P which is the maximum number of preamble signatures (e.g., $P \leq 16$); T which is the number of time offsets (e.g., T<8) whereby M is the total (P×T) number of logical access channels representing the number of processing units and time searching capability that the base station includes; and $K_i$ which is the maximum number of retransmission attempts for each class i.

Accordingly, in step 802, the remote terminal (via the processor associated therewith) determines whether a new access request is required due to receipt of packets to be transmitted. If so, in step 804, the remote terminal selects a preamble from among $(1, \ldots, P)$. Then, in step 806, for class i, the remote terminal selects one time offset from $(T_i, \ldots, T_i')$ such that $T_i < T_{i+1}$, $T_i' < T_{i+1}'$, $T_0 = 0$, $T_{max}' = 8$. For example, class 0 (highest priority class) can choose from the set of time offsets ranging between time offset 0 through time offset 4. In an alternative embodiment, the remote terminal can also store and then select a random chip delay at this point according to the RCDAP approach in FIG. 5. The access request is then transmitted on the selected logical access channel, in step 808.

Next, in step 810, the terminal determines whether the access request was successfully received by the base station. Again, this may be accomplished by the base station transmitting an access request acknowledge message to the terminal (step 1106 in FIG. 11). If the access request has been -successful, then the access priority control method ends (block 812) and the remote terminal can transmit its packets according to the packet transfer scheme employed in the UMTS.

However, if the request is not successful, in step 814, the terminal increments variable no_tx by one. In step 816, no_tx is compared to $K_i$. If no_tx is greater than $K_i$, then the current access request is dropped (step 818). If the maximum number of retransmissions has not been reached, then a backoff process is performed, in step 820. In an alternative embodiment, the backoff process is the same as described above in step 618. of FIG. 6. After backoff, the remote terminal waits, in step 822, for the next available access slot and then returns to step 804 to repeat the process.

Figure 9:
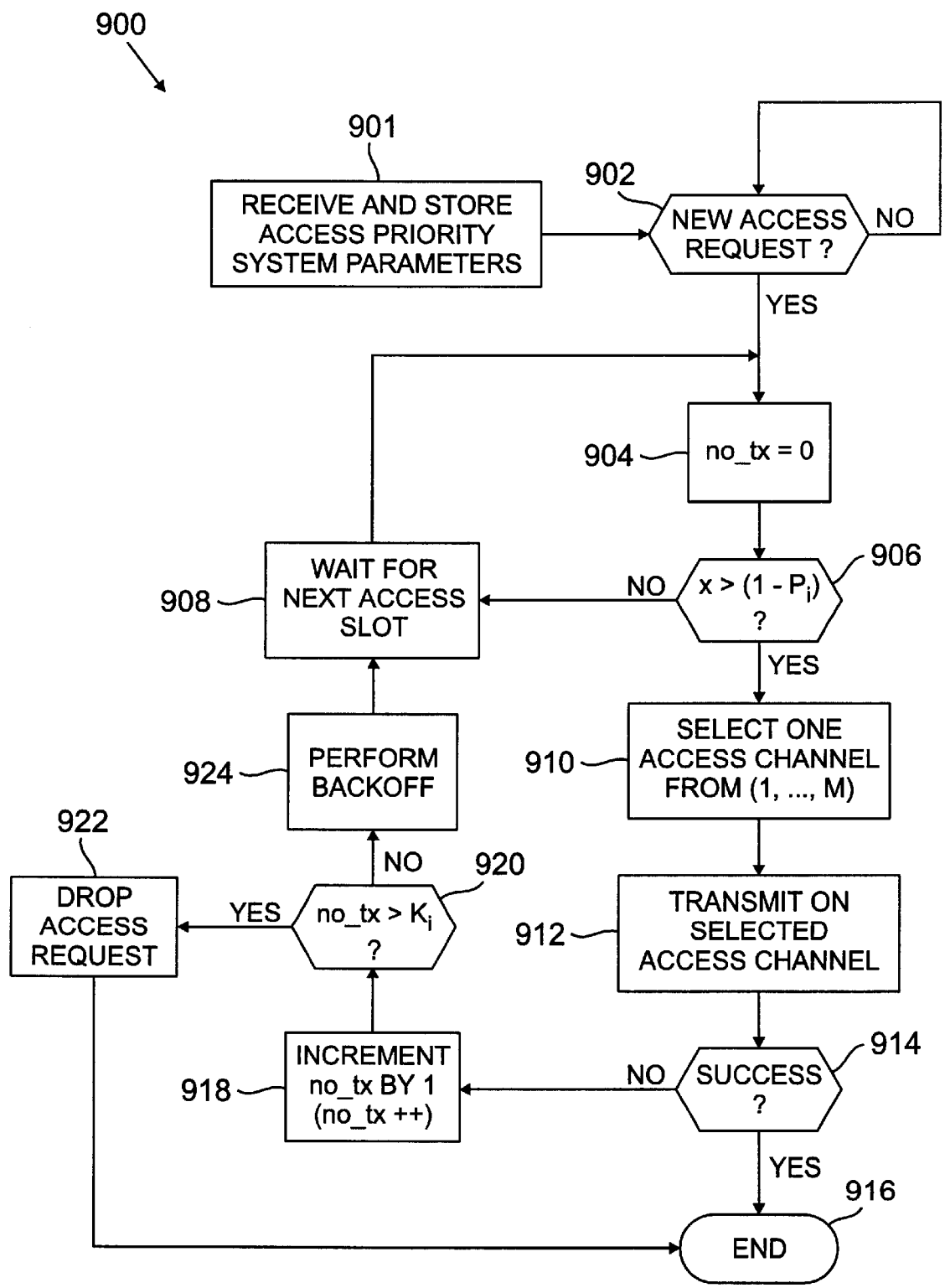
FIG. 9 is a flow chart of a method of access priority control at a remote terminal according to a fifth embodiment of the present invention.

Referring now to FIG. 9, a flow chart of a method 900 of access priority control at a remote terminal according to a fifth embodiment of the present invention is shown. Again, it is to be appreciated that this methodology is performed in a remote terminal (e.g., terminal 2 or 4) which has generated or received packets to be up-linked to a UMTS base station (e.g., base station 6). The embodiment illustrated in FIG. 9 is hereinafter referred to as Probability Based Access Priority (PBAP). Generally, in the PBAP approach, each subscriber is given an access priority class i. Each access priority class i can only transmit access requests with a certain probability $P_i$. Those with the highest priority (class 0) always transmit their access requests whenever they have an access request. For example, $P_0=1$ (high priority) and $P_1=0.5$ (low priority). Each access priority class also has a different maximum number of re-attempts. A lower access priority class has a lower maximum number of re-attempts.

In the access priority embodiment in FIG. 9, the remote terminal, in step 901, receives and stores (in its memory) the following access priority system parameters broadcast by the base station: M which is the number of logical access channels which exist between the remote terminal and the base station; probability $P_i$ for each class i; and $K_i$ which is the maximum number of transmission attempts associated with class I, where $P_i=1$ and $P_i<P_{i+1}$, $K_0=K_{max}$ and $K_{i+1}$, $<K_i$.

Accordingly, in step 902, the remote terminal (via the processor associated therewith) determines whether a new access request is required due to receipt of packets to be transmitted. If so, in step 904, the remote terminal sets variable no_tx=0. This is the retransmission attempts variable. Then, in step 906, the remote terminal determines if $x>(1-P_i)$. It is to be appreciated that x is a random variable uniformly distributed between 0 and 1. If x is not greater than $(1-P_i)$, the remote terminal waits, in step 908, for the next available access slot and then returns to step 904 to repeat the process. If $x>(1-P_i)$, the remote terminal selects a logical access channel (1, . . . , M). The access request is then transmitted on the selected logical access channel, in step 912. Next, in step 914, the terminal determines whether the access request was successfully received by the base station. Again, this may be accomplished by the base station transmitting an access request acknowledge message to the terminal (step 1106 in FIG. 11). If the access request has been successful, then the access priority control method ends (block 916) and the remote terminal can transmit its packets according to the packet transfer scheme employed in the UMTS.

However, if the request is not successful, in step 918, the terminal increments variable no_tx by one. In step 920, no_tx is compared to $K_i$. If no_tx is greater than $K_i$, then the current access request is dropped (step 922). If the maximum number of retransmissions has not been reached, then a backoff process is performed, in step 924. In an alternative embodiment, the backoff process is the same as described above in step 618 of FIG. 6. After backoff, the remote terminal waits, in step 908, for the next available access slot and then returns to step 904 to repeat the process.

Figure 10:
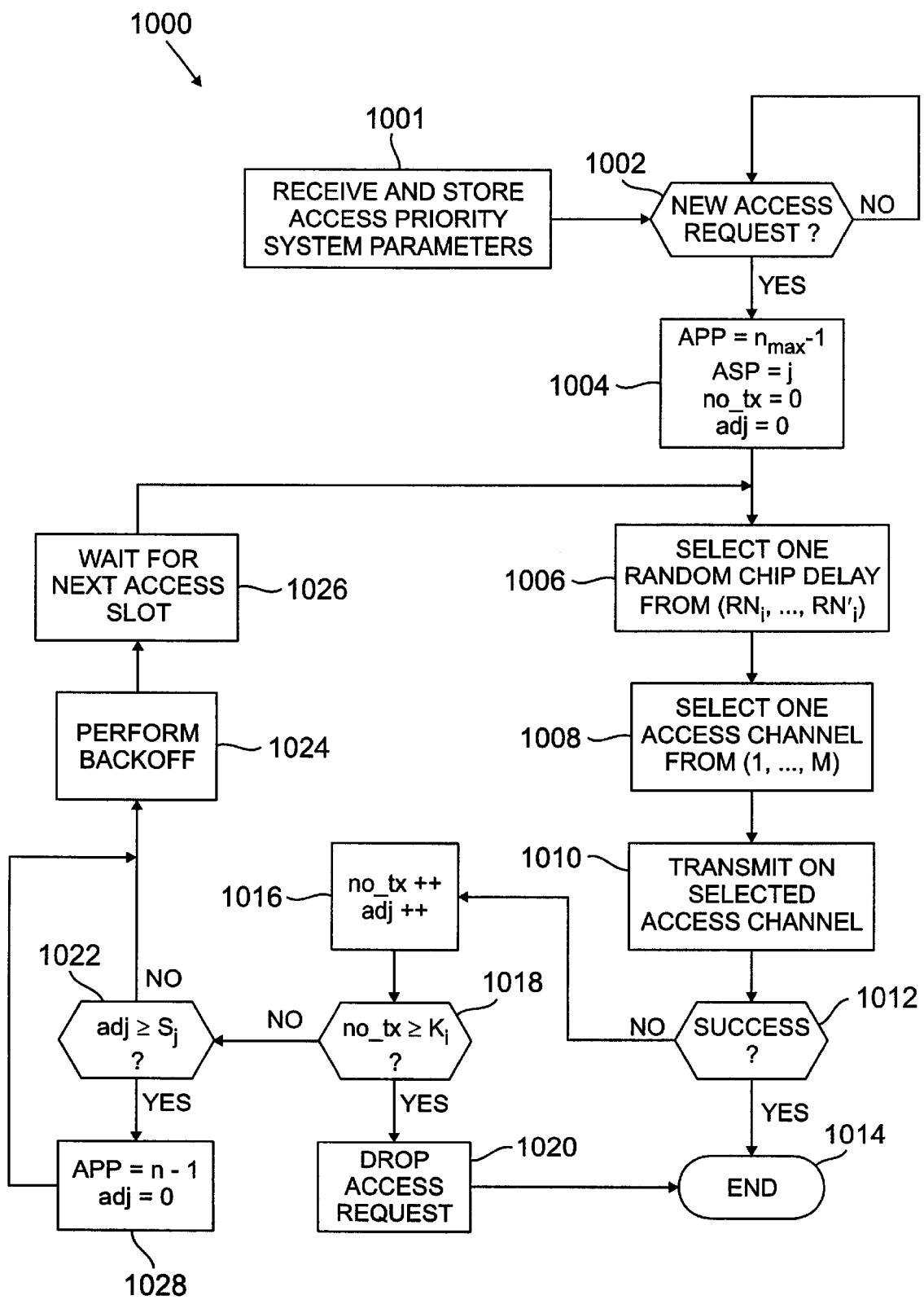
FIG. 10 is a flow chart of a method of access priority control at a remote terminal according to a sixth embodiment of the present inventions.

Referring now to FIG. 10, a flow chart of a method 1000 of access priority control at a remote terminal according to a sixth embodiment of the present invention is shown. It is to be appreciated that this methodology is performed in a remote terminal (e.g., terminal 2 or 4) which has generated or received packets to be up-linked to a UMTS base station (e.g., base station 6). The embodiment illustrated in FIG. 10 is hereinafter referred to as Retransmission Based Access Priority (REBAP). Generally, in the REBAP approach, it is assumed that all access requests have an access packet priority (APP) associated therewith. The REBAP scheme gives retransmitted access requests a higher priority over new access requests. Such a feature is attractive for certain applications which require a smaller $95^{th}$ or $99^{th}$ percentile access delay for all successful attempts rather than a smaller average access delay. All new access requests are given the lowest APP class ($n_{max}-1$). Then, their priorities are dynamically adjusted based on the number of retransmissions. The access packets can access all the M logical access channels but depending on the access packet priority class, they will choose a different random chip delay. The lowest APP class has the highest average random chip delay distribution from which to select. Those access requests that fail and need to be retransmitted preferably have their APP class adjusted. Note that an access service priority (ASP) class may also be defined in addition to the APP feature. Those requests with highest ASP, say class 0, will automatically increase their failed access requests' APP with each reattempt. Those with lower ASPs adjust the APP of their failed attempts less aggressively. For example, ASP class 1 may increase the APP of an access request only after it fails twice.

In the access priority embodiment in FIG. 10, the remote terminal, in step 1001, receives and stores (in its memory) the following access priority system parameters broadcast by the base station: M which is the number of logical access channels which exist between the remote terminal and the base station; APP which, for each class i, has two numbers associated therewith, namely, $K_i$ which is the maximum number of retransmission attempts for each class i and $RN_i$ which represents the random chip delay for each class i. Also, it is assumed that APP ranges from 0, . . . , $n_{max}-1$, where 0 has a higher priority. If ASP is used, then parameters ASP and $S_j$ are also transmitted by the base station and received and stored by the remote terminal. $S_j$ represents the number of retransmissions required for class j before the APP of the access requests, from that class j, will be updated. Thus, $K_i$ relates to the APP priority class and $S_j$ relates to the ASP priority class. For example, for ASP=0, 1, 2;$S_0=1, S_1=3$, $S_2=5$.

Accordingly, in step 1002, the remote terminal (via the processor associated therewith) determines whether a new access request is required due to receipt of packets to be transmnitted. If so, in step 1004, the remote terminal sets APP=$n_{max}-1$, ASP=j, no_tx=0, and adj=0 (adj is explained below). Then, in step 1006, the remote terminal selects a random chip delay from distribution ($RN_i$, . . . , $RN_i'$). In step 1008, the remote terminal selects a logical access channel (1, . . . , M). The access request is then transmitted on the selected logical access channel according to the chip delay, in step 1010. Next, in step 1012, the terminal determines whether the access request was successfully received by the base station. This may be accomplished by the base station transmitting an access request acknowledge message to the terminal (step 1106 in FIG. 11). If the access request has been successful, then the access priority control method ends (block 1014) and the remote terminal can transmit its packets according to the packet transfer scheme employed in the UMTS.

However, if the request is not successful, in step 1016, the terminal increments variables no_tx and adj by one. The variable no_tx represents the number of times an access request has been transmitted by the remote terminal and adj represents the variable used to check whether Sj has been reached. In step 1018, no_tx is compared to $K_j$. If no_tx is greater than or equal to $K_j$, then the current access request is dropped (block 1020). However, if no_tx is not greater than or equal to $K_j$, then the remote terminal determines whether adj is greater than or equal to Sj (step 1022). If no, APP remains the same as set in step 1004. Then, a backoff process is performed, in step 1024. The backoff process may be the same as described in step 618 in FIG. 6. After backoff, the remote terminal waits, in step 1026, for the next available access slot and then returns to step 1006 to repeat the process. However, if adj is greater than or equal to Sj, then APP is decreased by one (APP=n−1) thereby increasing the priority of the re-transmitted request (step 1028). Also adj is reset to zero in step 1028. Then, the backoff process is performed, in step 1024. After backoff, the remote terminal waits, in step 1026, for the next available access slot and then returns to step 1006 to repeat the process.

It is to be appreciated that use of the access priority methodologies of the invention, as described herein, may be useful and advantageous in a variety of applications. The following are merely a few examples of such applications. In existing wireless access systems, no provision has been provided to allow users that have an urgent need to gain access at a higher priority than other types of users. One possible implementations of access priority according to the invention is to reserve some logical access channels such that only emergency users can access. In another scenario, a service provider can differentiate, according to the present invention, between different types of customers based on the service charges that they pay. A CEO may desire to have a smaller access delay so that his messages can get across the network faster than others. Preferably, this service is coupled with service priority to ensure that users can perceive a better end-to-end delay. Also, in order to give smaller access delay to some real time services, e.g., interactive video, one may again use the access priority features of the invention to achieve this purpose. In addition, the present invention provides new access features to be included in UMTS MAC. Access priority can be used together with scheduling algorithms to provide different Quality of Service to customers either based on service charge, emergency needs or delay requirements.

Although illustrative embodiments of the present invention have been described herein with reference to the accompanying drawings, it is to be understood that the invention is not limited to those precise embodiments, and that various other changes and modifications may be affected therein, by one skilled in the art without departing from the scope and spirit of the invention. For example, although certain variations of the embodiments illustrated in the flow charts were described above, it is to be appreciated that the present invention contemplates combining any embodiment, or variation thereof, with one or more other embodiments, or variations thereof.

ODMAFO MAC Protocol Operation

Figure 12A:
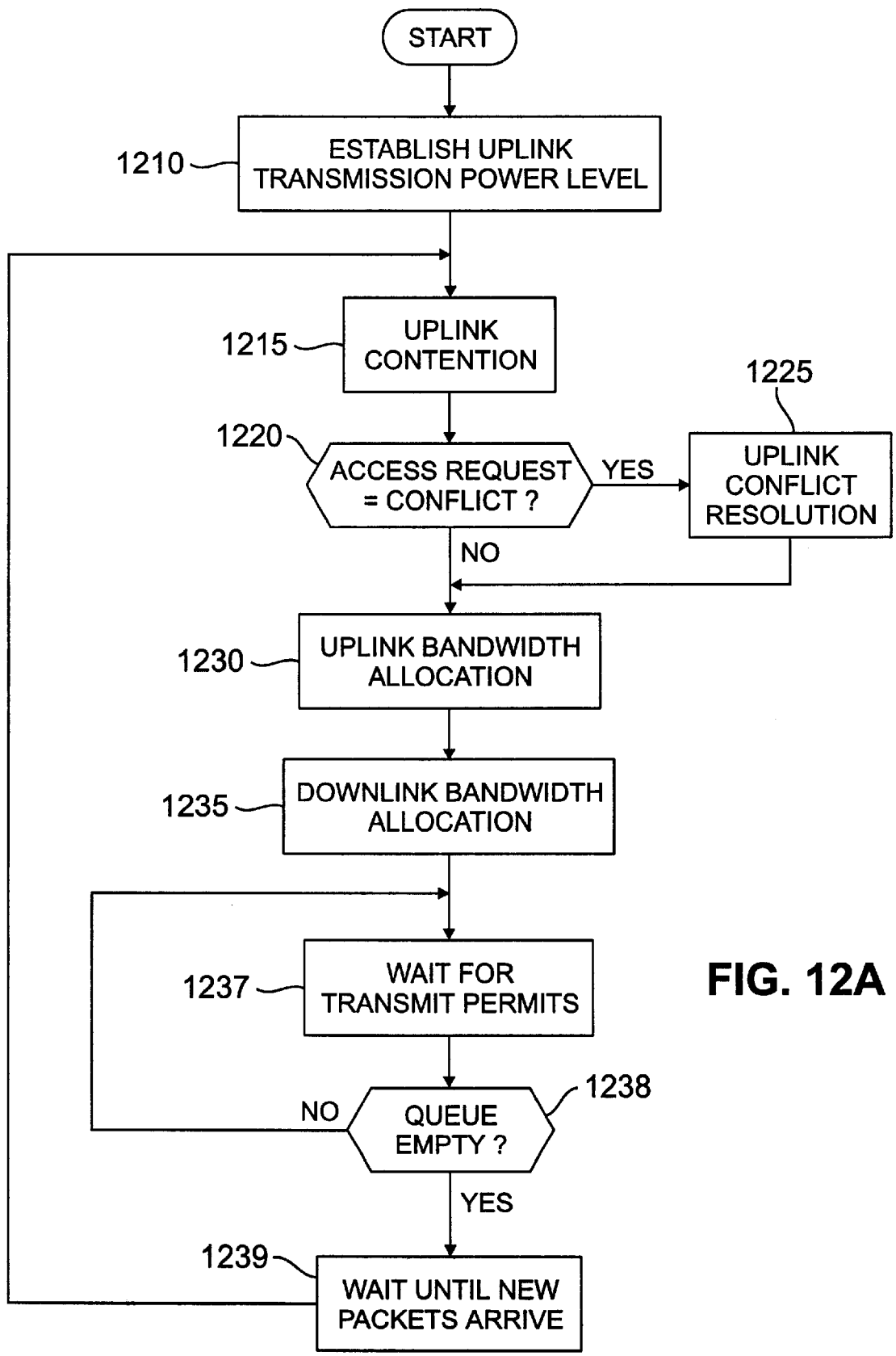
FIG. 12A is a flowchart illustrating the overall ODMAFQ protocol operation, as viewed by the remote host.
Figure 12B:
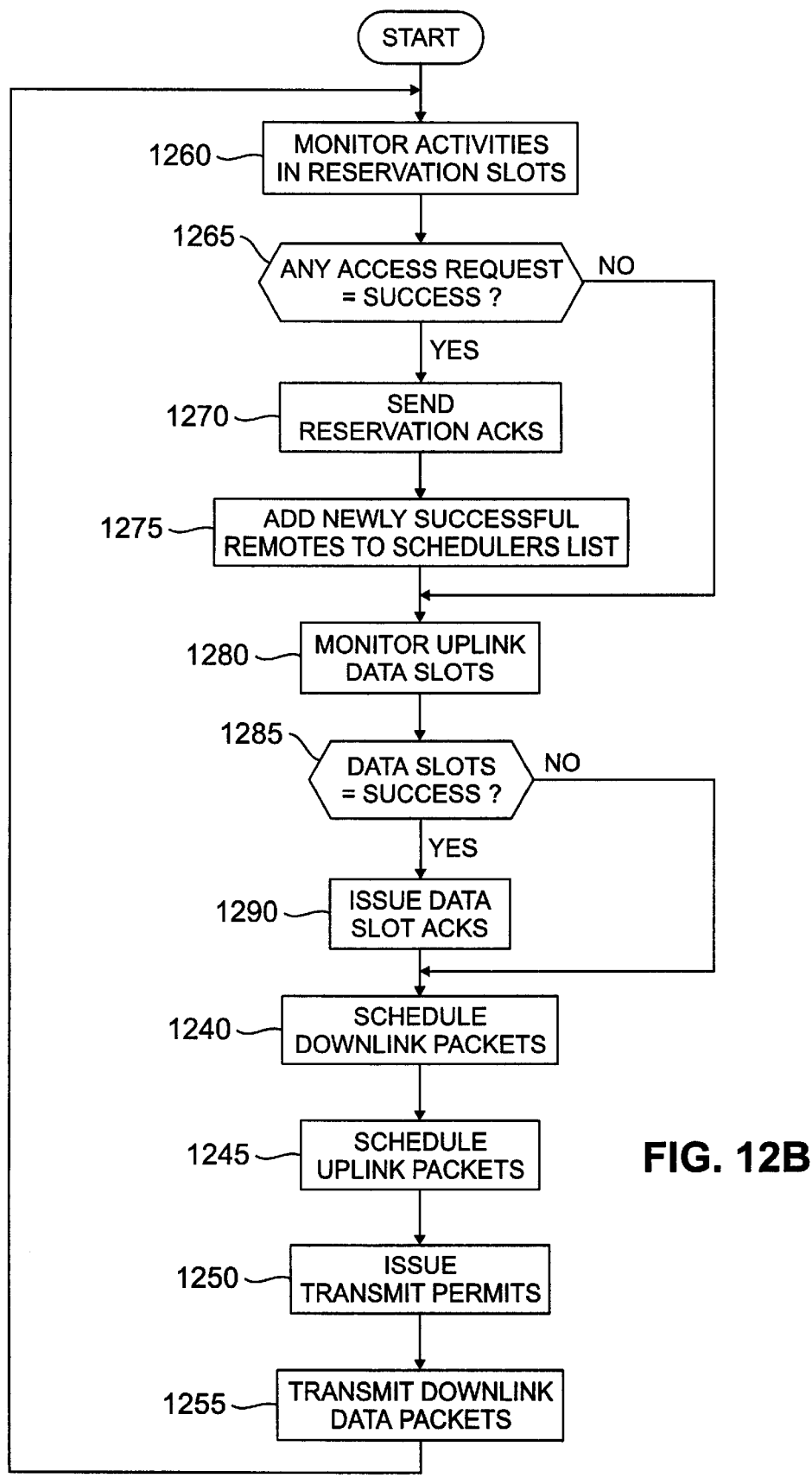
FIG. 12B is a flowchart illustrating the overall ODMAFQ protocol operation, as viewed by the base station.

The overall ODMAFQ MAC protocol operation is illustrated in the flowcharts of FIGS. 12A and 12B. As seen from a remote host (terminal), FIG. 12A, after establishment of the power level for uplink transmission 1210, the remote hosts participate in uplink initial contention 1215 during which each remote with packets to send requests access to the AP (base station). If some of these access requests collide 1220, in that they are submitted in the same reservation mimslot, the colliding remote hosts participate in uplink conflict resolution 1225. Otherwise, the AP proceeds to allocate uplink bandwidth 1230 among the remote hosts requesting access, followed by allocation of bandwidth for its own downlink transmission 1235. Each remote host waits to receive a transmit permit 1237 during a subsequent downlink transmission and, upon receiving one, transmits a waiting packet from its queue. If the queue at a remote is not then empty 1238, the remote returns to waiting for additional transmit permits 1237, otherwise it waits for new packets to arrive 1239.

As illustrated in FIG. 12B, the AP monitors activity in the received contention reservation slots 1260. When it receives a successful access request 1265, the AP sends reservation acknowledgments (ACKs) 1270 and adds the newly successful remotes to the scheduled list 1275. Whether or not there have been new successful access requests 1265, the AP also monitors the uplink dataslots 1280 as long as the scheduled list is not empty, and when it receives a successfully transmitted packet 1285, it replies with a data ACK 1290. The AP then schedules its downlink packets 1240, schedules the uplink transmissions 1245 of the successfully contending remote hosts, issues the associated transmit permits 1250, and then transmits downlink data packets 1255, after which it returns to monitoring activity in the, contention reservation slots 1260.

It may be desirable to allow for an optional channel holding feature whereby each queue can remain empty for a short while without the Access Point releasing the bandwidth reservation. This allows high priority users to remain in the base station's reserved bandwidth list for an allotted amount of time before it is released, encouraging low latency of real-time packets (i.e. little or no delay, for packets of time-sensitive data such as voice communications) by avoiding all the setup signaling messaging required for channel reservation. Utilizing this feature, when a queue is empty, a timer is triggered at the wireless modem. As long as new packets arrive at the wireless modem before this timer expires, the wireless modem does not need to make a new access request. At the AP, if this feature is turned on, then the AP will still allocate a transmit permit for one data slot, to this particular wireless modem every alternate uplink frame, even if the last uplink data transmission from the wireless modem has indicated that the queue is empty. The AP will also start a timer. When the timer expires and the AP has not received new packets from that wireless modem, then the AP will remove the wireless modem from the reserved bandwidth list. This channel holding feature is particularly useful if the bandwidth reservation process takes a while to complete, allowing low latency for real-time packets that, while not arriving back-to-back, are not so far apart as to warrant a separate bandwidth reservation request via contention for each data packet. However, for bursty sources that do not need this channel holding feature, when a packet arrives to find an empty buffer, the modem will still send an access request to the AP via one of the contention minislots.

Figure 13A:
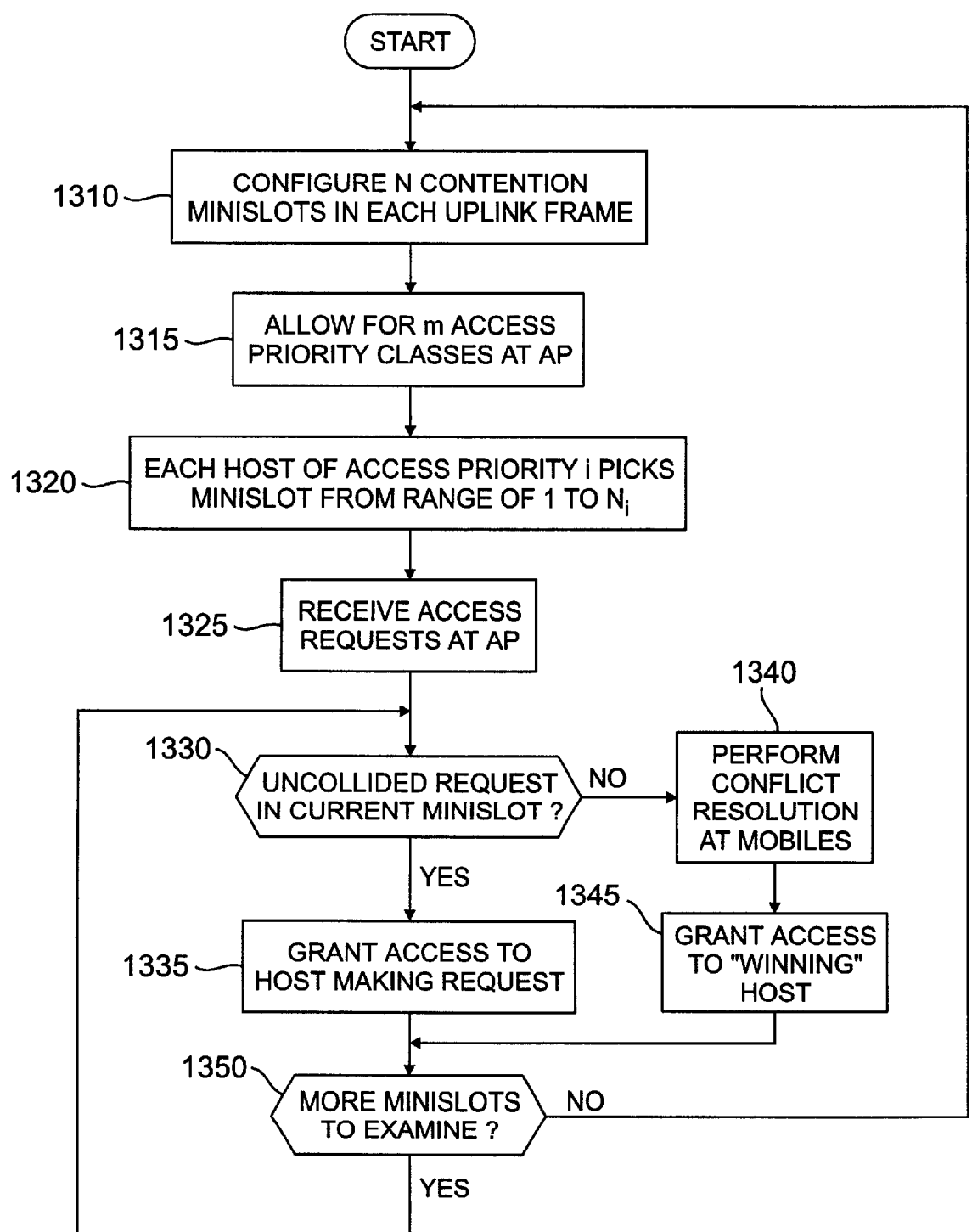
FIG. 13A is a flowchart illustrating an embodiment of a method for ODMAFQ access control.

FIG. 13A illustrates is an embodiment of a method for access control. N contention reservation minislots are configured in each, uplink frame 1310. The N minislots are organized into a plurality of access priority classes, each class having a different priority. The AP is configured to allow m access priority classes 1315. Each remote host of access priority class i, randomly picks 1320 one contention minislot and transmits an access request, the contention minislot picked being in a range from 1 to $N_i$ where $N_{(i+1)} < N_i$ and $N_i = N$. The base station receives 1325 the access requests and sequentially examines the received contention minislots. If the minislot currently being examined contains an uncollided request 1330, the AP grants access 1835 to the remote host corresponding to the uncollided access request. If the minislot currently being examined contains a collided request 1330, the AP will not send an ACK, causing the affected remote nodes to perform conflict resolution 1340. After the conflict resolution period, the AP grants access to the "winning" remote host 1345. Meanwhile, if more minislots remain to be examined 1350, the AP continues to check minislots for collisions 1330, either granting access to successful requesting hosts 1335 or awaiting the outcome of conflict resolution 1340.

Figure 13B:
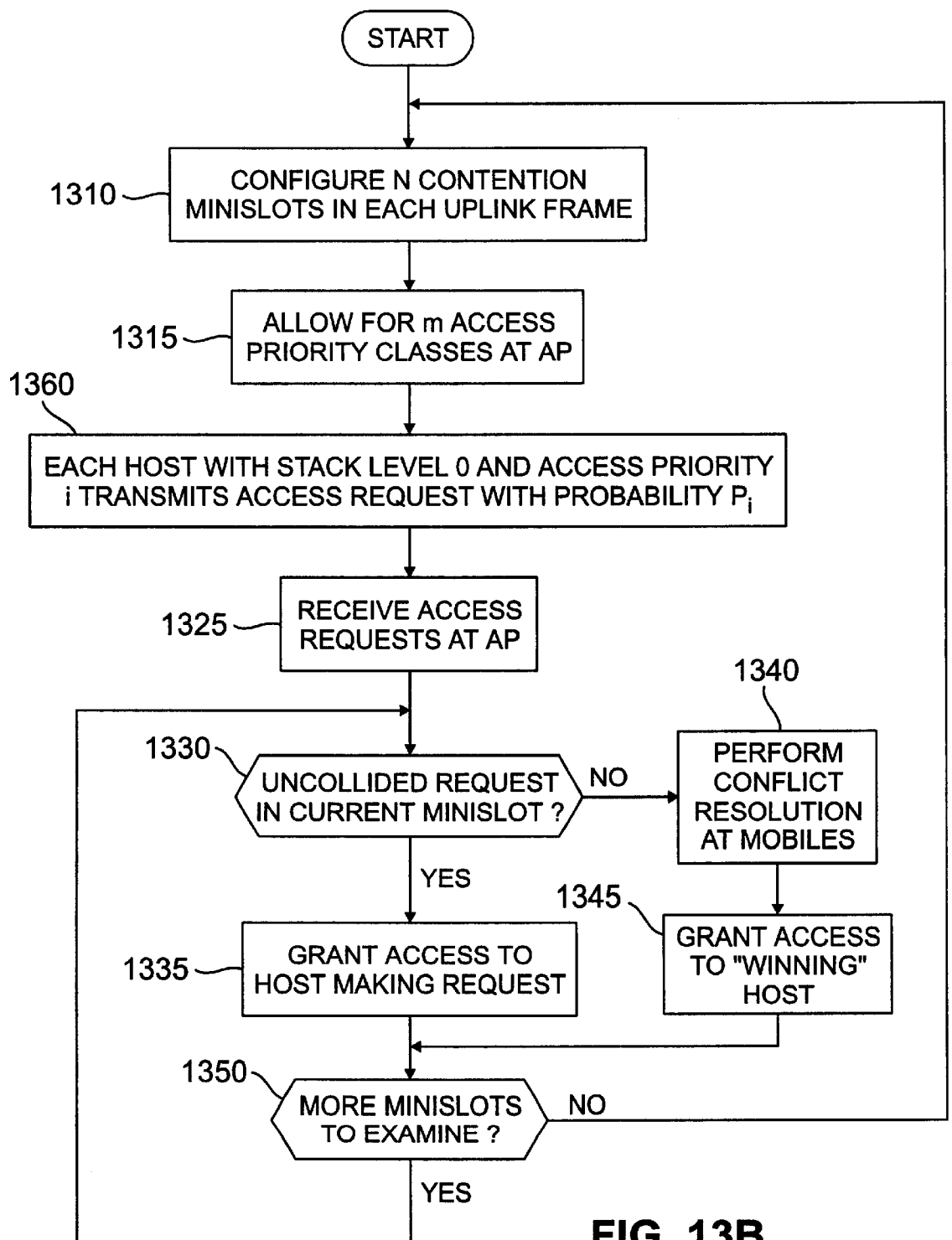
FIG. 13B is a flowchart illustrating an alternate embodiment of a method for ODMAFQ access control.

FIG. 13B is a flowchart illustrating an alternate embodiment of a method for access control. The N minislots are organized into a plurality of access priority classes, each with a different priority. N contention reservation minislots are configured in each uplink frame 1310. The N minislots are organized into a plurality of access priority classes, each class having a different priority. The AP is configured to allow m access priority classes 1315. Each remote host of access priority class i and with a stack level that equals 0, then transmits an access request with a probability $P_i$ where $P_{(i+1)} < P_i$ and $P_i = 1$ 1360. The base station receives 1325 the access requests and sequentially examines the received contention minislots. If the minislot currently being examined contains an uncollided request 1330, the AP grants access 1335 to the remote host corresponding to the uncollided access request. If the minislot currently being examined contains a collided request 1330, the AP will not send an ACK, causing the affected remote nodes to perform conflict resolution 1340. After the conflict resolution period, the AP grants access to the "winning" remote host 1345. If more minislots remain to be examined 1350, the AP continues to check minislots for collisions 1330, either granting access to successful requesting hosts 1335 or awaiting the outcome of conflict resolution 1340.

IDLE, SUCCESS and COLLISION status information is conveyed back to the wireless modems. The AP places the slot status information in the downlink reservation acknowledgment field. There, are three alternative preferred conflict resolution methods that may be used. The first method is suggested in the IEEE 802.14 standard, and is described along with two new methods below. Simulation results show that the second method described provides a better access delay.

In the first conflict resolution method, suggested in IEEE standard 802.14, each wireless node that wishes to transmit randomly picks one of the reservation minislots. If a collision is indicated, a modem that was affected by the collision retransmits based on a random binary-exponential back-off method. This backoff method operates in accordance with the following:

1. The modem generates a random number, I, uniformly distributed between 0 and $2^j - 1$, where j is the number of collisions that the modem experienced for the packet it is attempting to transmit. If j is larger than 10, then I is selected from a uniform distribution between 0 and $2^{10} - 1$.
2. The modem skips the next I-1 contention slot opportunities of the same kind (either minislot or data contention slot), and then retransmits its previously collided packet in the next immediate contention slot opportunity.

Figure 14A:
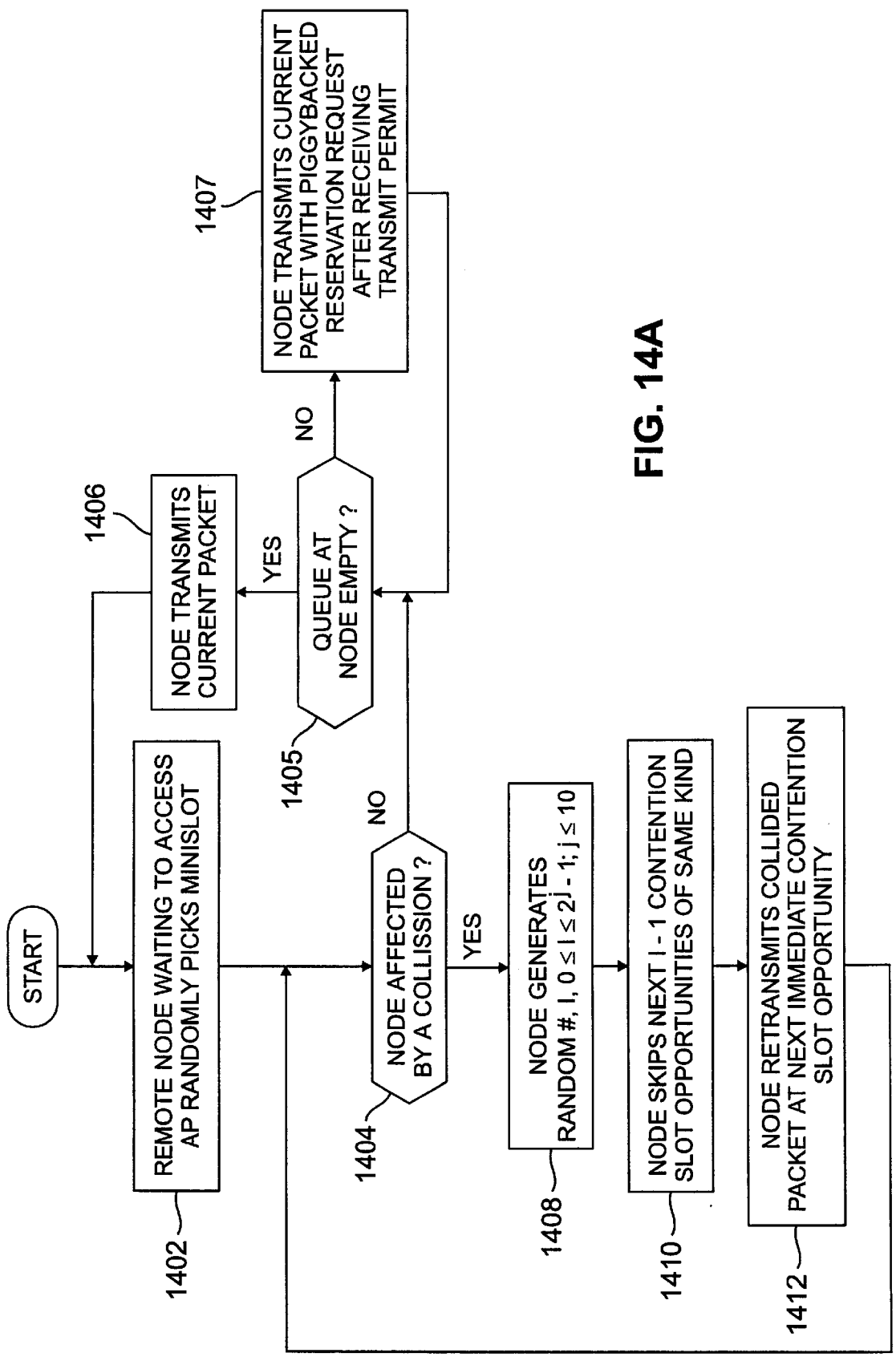
FIGS. 14A–14C are flowcharts illustrating three ODMAFQ contention resolution methods.

The operation of this method is depicted in FIG. 14A. A wireless node waiting to access the AP randomly picks 1402 a reservation minislot in which to transmit an access request. If the node is affected by a collision 1404, the node generates 1408 the random number I and skips 1410 the next I-1 contention slot opportunities of the same kind. The node than retransmits 1412 the access request for the collided packet at the next immediate contention slot opportunity. If the node is not affected by a collision 1404, then if the queue at the node is empty 1405, the node transmits 1406 the packet and returns to the waiting state 1402. If the queue at the node is not empty 1405, then, after receiving a transmit permit from the AP, the node transmits 1407 the current packet along with a piggybacked reservation request for transmission of the next packet in its queue, continuing to transmit packets with piggybacked reservation requests 1407 after receiving transmit permits until the queue is empty 1405 and the final packet has been transmitted 1406, after which the node returns to the waiting state 1402.

In the second and third methods, the AP broadcasts the outcome of each contention in the reservation minislots to all wireless nodes via a downlink broadcast message. In the second method, the modem in each wireless node is characterized by a stack level, and only wireless nodes with a stack level equal to zero are permitted to transmit access request packets. Modems with a stack level greater than zero are regarded as backlogged. For example, when there are M reservation minislots, each remote node at stack level 0 can randomly pick one of the M minislots. At the end of a timeslot, wireless node i changes stack level based on the outcome of a transmission in that time slot. This method allows newly active wireless nodes to join in with those existing wireless nodes having stack level 0 during a particular conflict resolution period. Each wireless node in a request state increments its stack level by one if it does not transmit an access request packet and receive a negative acknowledgment (e.g., that there was a collision) from the base station (AP). On the other hand, a wireless node decrements its stack level by one if it receives a positive acknowledgment from the base station, indicating successful transmission of an access request. Each wireless node that participates in the access request transmission randomly "flips a coin" to determine whether its stack level stays at level 0 or is incremented by one upon receiving a negative acknowledgment from the base station.

The rules of the second method are:

1. When a wireless node first wishes to gain access to the network or has gained access and wishes to send new data, it is placed in a request state and assigned a stack level of zero.
2. When there are M reservation minislots, each wireless node in a request state randomly picks one of the M reservation minislots to be its assigned minislot in which to transmit an access request packet.
3. When the wireless node is characterized by a stack level equal to zero, it transmits an access request packet; however, when the remote node is characterized by a stack level other than zero, it does not transmit an access request packet.
4. At the end of the time slot, each wireless node changes its stack level based on the outcome (either COLLIDED, IDLE or SUCCESS) of an access request, as reported for its assigned minislot in the reservation acknowledgment field of a downlink message from the access point.
   A. A wireless node that sent an access request and received a SUCCESS outcome will be removed from the request state.
   B. A wireless node that sent an access request and received a COLLIDED outcome will either increment its stack level by one or leave its stack level at zero depending upon the outcome of a random draw.
   C. A wireless node that is in the request state and did not send an access request (i.e., a node backlogged with stack level >0) will increment its stack level by one if the outcome reported in the reservation acknowledgment field for the assigned minislot is COLLIDED.

D. A wireless node that is in the request state and that did not send an access request (i.e., a node backlogged with stack level >0) will decrement its stack level by one if the outcome reported in the reservation acknowledgment field for the assigned minislot is SUCCESS.

Figure 14B:
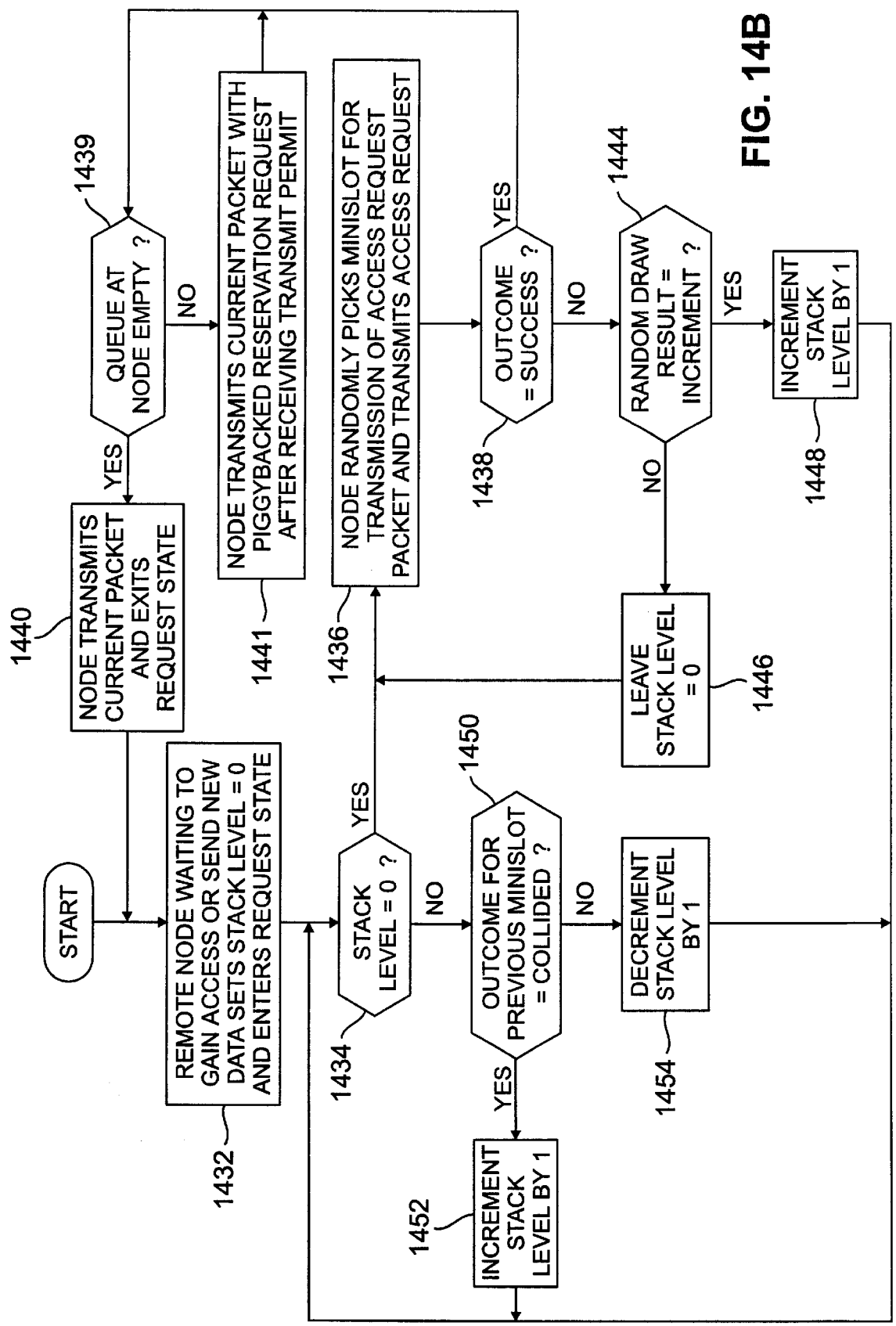

The operation of this method is depicted in FIG. 14B. A wireless node waiting to access the AP or send new data 1432 sets its stack level to 0 and enters the request state. If the stack level of the node is 0 1434, the node randomly picks 1436 a reservation minislot for transmission of an access request and transmits the access request. If the outcome of the request is SUCCESS 1438, and the queue at the node is empty 1439, the node transmits 1440 the current packet and exits the request state, returning to the waiting state 1432. If the queue at the node is not empty 1439, then, after receiving a transmit permit from the AP, the node transmits 1441 the current packet along with a piggybacked reservation request for transmission of the next packet in its queue, continuing to transmit packets with piggybacked reservation requests 1441 after receiving transmit permits until the queue is empty 1439, at which point it transmits the remaining packet 1440, exits the request state, and returns to the waiting state 1402.

If the outcome of the reservation request 1436 was not SUCCESS 1438, the node participates in a random draw 1444 to learn whether to increment 1448 its stack level by 1 or leave 1446 its stack level at 0. If the stack level remains 1446 at 0, the node again randomly picks 1436 a reservation minislot for transmission of an access request and transmits the access request. If the stack level is incremented 1448, the stack level will not be 0 1434. If the stack level of any remote node is not 0 1434 then if the outcome of the previous reservation request was COLLIDED 1450, the node increments 1452 its stack level by 1. If the outcome for the previous reservation request was not COLLIDED. 1450, the node decrements 1454 its stack level by 1.

The third conflict resolution method is a modification of the second. In the third conflict resolution method, the modem in each wireless node is again characterized by a stack level, and only wireless nodes with a stack level equal to zero are permitted to transmit access request packets. Modems with stack level greater than zero are regarded as backlogged. The rules of the third method are:

1. When a wireless node first wishes to gain access to the network or has gained access and wishes to send new data, it is placed in a request state and assigned a stack level of zero.
2. When there are M reservation minislots, each wireless node in a request state randomly picks one of the M reservation minislots to be its assigned minislot in which to transmit an access request packet.
3. When the wireless node is characterized by a stack level equal to zero, it transmits an access request packet; however, when the remote node is characterized by a stack level other than zero, it does not transmit an access request packet.
4. At the end of the time slot, each wireless node changes its stack level based on the outcome (either COLLIDED, IDLE or SUCCESS) of all access requests as reported in the reservation acknowledgment fields of a downlink message from the Access Point.
   A. A wireless node that sent an access request and received a SUCCESS outcome will be removed from the request state.
   B. A wireless node that sent an access request and received a COLLIDED outcome will either increment its stack level by one or leave its stack level at zero depending on the outcome of a random draw.
   C. A wireless node that is in the request state and that did not send an access request (i.e., a node backlogged with stack level>0) will decrement its stack level by one if the outcomes of all access requests reported in at least 80% (or come other predefined threshold) of the reservation acknowledgment fields is either SUCCESS or IDLE. Otherwise, the remote node will increment its stack level by one.
   D. When the backlogged modem's stack level is decremented to zero, the modem randomly picks one of the M minislots (or the $I_i$ minislots if access priority is implemented) to resend its request.

Figure 14C:
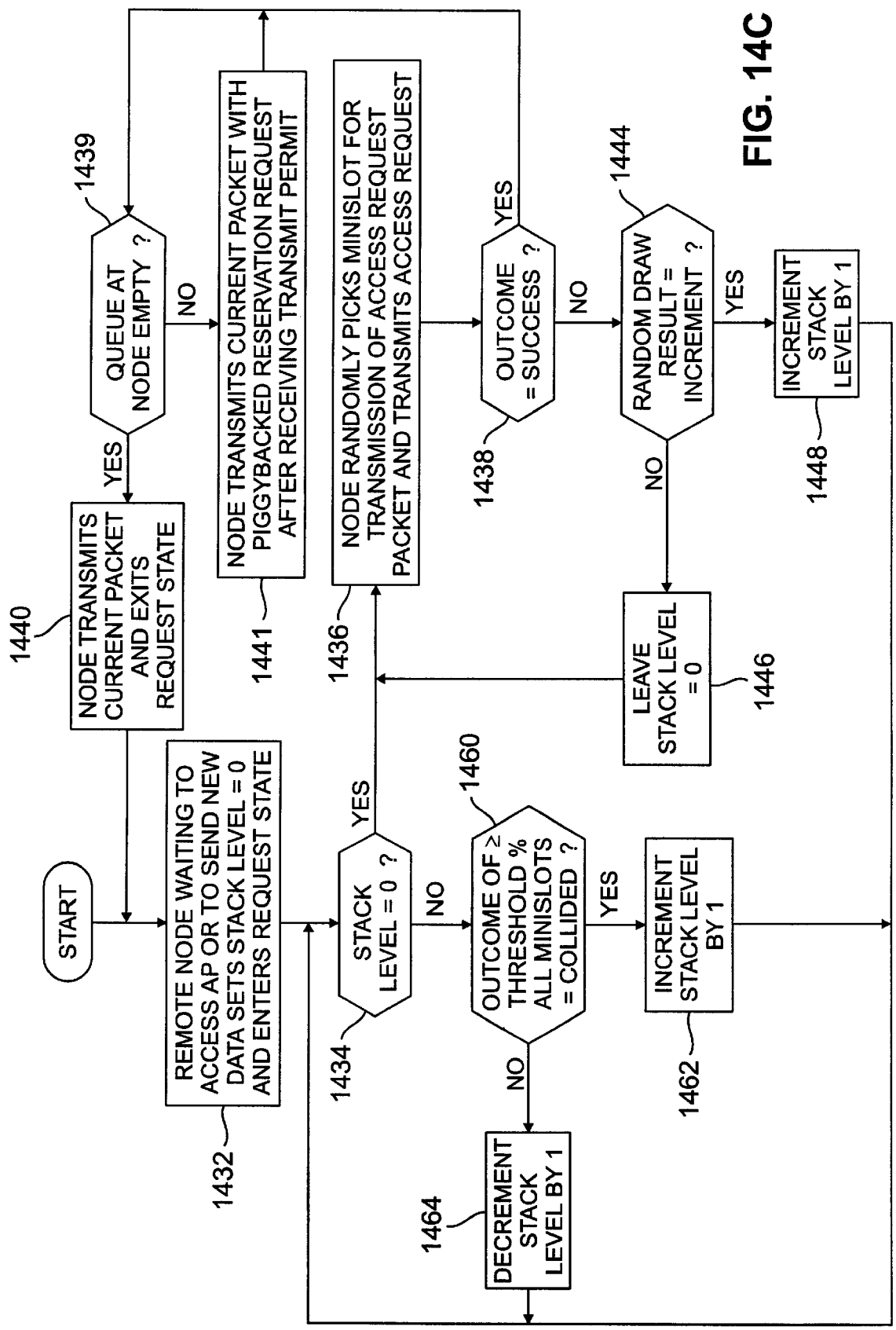

The operation of this method is depicted in FIG. 14C and is similar to that of the method of FIG. 14B. A wireless node waiting to access the AP or send new data 1432 sets its stack level to 0 and enters the request state. If the stack level of the node is 0 1434, the node randomly picks 1436 a reservation minislot for transmission of an access request and transmits the access request. If the outcome of the request is SUCCESS 1438, and the queue at the node is empty 1439, the node transmits 1440 the current packet and exits the request state, returning to the waiting state 1432. If the queue at the node is not empty 1439, then, after receiving a transmit permit from the AP, the node transmits 1441 the current packet along with a piggybacked reservation request for transmission of the next packet in its queue, continuing to transmit packets with piggybacked reservation requests 1441 after receiving transmit permits until the queue is empty 1439 and it has transmitted the remaining packet 1440, after which it exits the request state, and returns to the waiting state 1402.

If the outcome of the reservation request 1436 was not SUCCESS 1438, the node participates in a random draw 1444 to learn whether to increment 1484 its stack level by 1 or leave 1446 its stack level at 0. If the stack level remains 1446 at 0, the node again randomly picks 1436 a reservation minislot for transmission of an access request and transmits the access request. If the stack level is incremented 1448, the stack level will not be 0 1434. If the stack level of any remote node is not 0 1434, then if the outcome of all the reservation requests during the previous cycle was COLLIDED 1460 for greater than or equal to some THRESHOLD percentage, the node increments 1462 its stack level by 1. If the outcome for the previous reservation request was not COLLIDED 1460, the node decrements 1464 its stack level by 1.

What is claimed is:

1. A method of access priority control in a remote terminal of a wireless communications system, the method comprising the steps of:
   selecting a backoff delay from different backoff delays respectively associated with pre-established access priority classes after determining that a transmitted access request signal has not been received at a base station in the wireless communications system; and
   transmitting a new access request signal on a selected logical access channel to the base station after the backoff delay.

2. The method of claim 1, wherein a higher access priority class is associated with a lower backoff delay.

3. The method of claim 1, wherein a lower access priority class is associated with a higher backoff delay.

4. The method of claim 1, wherein determining that the transmitted access request signal has not been received by the base station includes monitoring for receipt of an acknowledgment signal from the base station indicating receipt of the access request signal.

5. The method of claim 1, further including the step of incrementing a variable indicative of a number of access request transmission attempts made to the base station after the determination that a previously transmitted access request has not been received by the base station.

6. The method of claim 5, further including the step of comparing the access request transmission attempt variable to a value indicative of a maximum allowable number of transmission attempts, the maximum allowable transmission attempt value being a function of the pre-established access priority classes.

7. The method of claim 6, further including the step of dropping the access request when the access request transmission attempt variable is greater than the maximum allowable transmission attempt value.

8. The method of claim 7, wherein the backoff delay selection step is performed when the access request transmission attempt variable is not greater than the maximum allowable transmission attempt value.

9. The method of claim 1, wherein the pre-established access priority classes relate to one of service level, message content, and delay requirements.

10. The method of claim 1, further comprising the step of receiving the backoff delays from the base station.

11. The method of claim 1, wherein the backoff delays are associated with random distributions of backoff delays which are respectively associated with the pre-established access priority classes and the selected backoff delay is selected from one of the distributions.

12. The method of claim 1, further including the step of selecting the logical access channel for transmission from among a set of logical access channels, the set including a quantity of logical access channels, the quantity being a function of the pre-established access priority classes.

13. The method of claim 1, further including the step of selecting the logical access channel for transmission by selecting a preamble and a time offset from a set of preambles and a set of time offsets associated with a plurality of logical access channels.

14. The method of claim 13, wherein the set of time offsets are a function of the pre-established access priority classes.

15. The method of claim 1, wherein the pre-established access priority classes have probabilities assigned thereto such that an access request signal is transmitted according to the assigned probability of the class with which the access request is associated.

16. The method of claim 1, wherein the wireless communications system is a Universal Mobile Telecommunications System (UMTS).

17. The method of claim 1, wherein the selected logical access channel is a random access channel (RACH).

18. A method of access priority control in a base station of a wireless communications system, the method comprising the steps of:
broadcasting backoff delays respectively associated with pre-established access priority classes; and
transmitting an acknowledgement signal to a remote terminal in the wireless communications system from which an access request signal has been received.

19. Apparatus for access priority control in a wireless communications system, comprising:
a remote terminal configured for selecting a backoff delay from backoff delays respectively associated with pre-established access priority classes after determining that a transmitted access request signal has not been received at a base station in the wireless communications system, and for transmitting a new access request signal on a selected logical access channel to the base station after the backoff delay.

20. The apparatus of claim 19, wherein the remote terminal is a mobile terminal.

21. The apparatus of claim 19, wherein the remote terminal is a fixed terminal.

22. The apparatus of claim 19, wherein a higher access priority class is associated with a lower backoff delay.

23. The apparatus of claim 19, wherein a lower access priority class is associated with a higher backoff delay.

24. The apparatus of claim 19, wherein determining that the transmitted access request signal has not been received by the base station includes the remote terminal monitoring for receipt of an acknowledgment signal from the base station indicating receipt of the access request signal.

25. The apparatus of claim 19, further wherein the remote terminal increments a variable indicative of a number of access request transmission attempts made to the base station after the determination that a previously transmitted access request has not been received by the base station.

26. The apparatus of claim 25, further wherein the remote terminal compares the access request transmission attempt variable to a value indicative of a maximum allowable number of transmission attempts, the maximum allowable transmission attempt value being a function of the pre-established access priority classes.

27. The apparatus of claim 26, further wherein the remote terminal drops the access request when the access request transmission attempt variable is greater than the maximum allowable transmission attempt value.

28. The apparatus of claim 27, wherein the remote terminal performs the backoff delay selection step when the access request transmission attempt variable is not greater than the maximum allowable transmission attempt value.

29. The apparatus of claim 19, wherein the pre-established access priority classes relate to one of service level, message content, and delay requirements.

30. The apparatus of claim 19, further wherein the remote terminal receives the backoff delays from the base station.

31. The apparatus of claim 19, wherein the backoff delays are associated with random distributions of backoff delays which are respectively associated with the pre-established access priority classes and the selected backoff delay is selected from one of the distributions.

32. The apparatus of claim 19, further wherein the remote terminal selects the logical access channel for transmission from among a set of logical access channels, the set including a quantity of logical access channels, the quantity being a function of the pre-established access priority classes.

33. The apparatus of claim 19, further wherein the remote terminal selects the logical access channel for transmission by selecting a preamble and a time offset from a set of preambles and a set of time offsets associated with a plurality of logical access channels.

34. The apparatus of claim 33, wherein the set of time offsets are a function of the pre-established access priority classes.

35. The apparatus of claim 19, wherein the pre-established access priority classes have probabilities assigned thereto such that an access request signal is transmitted according to the assigned probability of the class with which the access request is associated.

36. The apparatus of claim 19, wherein the wireless communications system is a Universal Mobile Telecommunications System (UMTS).

37. The apparatus of claim 19, wherein the selected logical access channel is a random access channel (RACH).

38. Apparatus for access priority control in a wireless communications system, comprising:

a base station configured for broadcasting backoff delays respectively associated with pre-established access priority classes and for transmitting an acknowledgement signal to a remote terminal in the wireless communications system from which an access request signal has been received.

\* \* \* \* \*